United States Patent
Kim et al.

(10) Patent No.: US 9,674,532 B2
(45) Date of Patent: Jun. 6, 2017

(54) IMAGE DECODING METHOD USING INFORMATION ON A RANDOM ACCESS PICTURE AND APPARATUS USING SAME

(71) Applicant: LG Electronics Inc., Seoul (KR)

(72) Inventors: Chulkeun Kim, Seoul (KR); Joonyoung Park, Seoul (KR); Sangoh Jeong, Seoul (KR); Hendry Hendry, Seoul (KR); Byeongmoon Jeon, Seoul (KR); Jungsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 124 days.

(21) Appl. No.: 14/398,581

(22) PCT Filed: Jun. 24, 2013

(86) PCT No.: PCT/KR2013/005524
§ 371 (c)(1),
(2) Date: Nov. 3, 2014

(87) PCT Pub. No.: WO2014/003379
PCT Pub. Date: Jan. 3, 2014

(65) Prior Publication Data
US 2015/0124864 A1    May 7, 2015

Related U.S. Application Data

(60) Provisional application No. 61/813,654, filed on Apr. 19, 2013, provisional application No. 61/666,915, (Continued)

(51) Int. Cl.
*H04N 19/36* (2014.01)
*H04N 19/105* (2014.01)
(Continued)

(52) U.S. Cl.
CPC ......... *H04N 19/105* (2014.11); *H04N 19/136* (2014.11); *H04N 19/172* (2014.11);
(Continued)

(58) Field of Classification Search
CPC .. H04N 19/105; H04N 19/172; H04N 19/136; H04N 19/70; H04N 19/30; H04N 19/46
See application file for complete search history.

(56) References Cited

U.S. PATENT DOCUMENTS 6,072,831 A * 6/2000 Chen ................... H04N 19/177
348/43
7,010,043 B2 * 3/2006 Kerofsky ....... H04N 21/234327
375/240.19

(Continued)

FOREIGN PATENT DOCUMENTS

KR    1020100030648 A    3/2010
KR    1020110106465 A    9/2011
(Continued)

OTHER PUBLICATIONS

ITU-T (Series H: Audiovisual and Multimedia System—Infrastructure of audiovisual services—Coding of moving video—Advanced video coding for generic audiovisual services, ITU-T H.264, Jan. 2012), ("ITU-T").*
(Continued)

*Primary Examiner* — Sath V Perungavoor
*Assistant Examiner* — Philip Dang
(74) *Attorney, Agent, or Firm* — Dentons US LLP

(57) ABSTRACT

The present invention relates to an image decoding method and to an apparatus using same. The image decoding method includes the steps of: receiving a bitstream including random access image information; and predicting the random access
(Continued)

C : (0,0,0) LA : (0,0,1)
(Spatial level, Quality Level, Temporal Level)

→ : INTER PREDICTION
⇢ : INTER-LAYER PREDICTION image and an image following the random access image in terms of a decoding sequence on the basis of the random access image information.

6 Claims, 17 Drawing Sheets

Related U.S. Application Data filed on Jul. 1, 2012, provisional application No. 61/663,618, filed on Jun. 24, 2012.

(51) Int. Cl.
  *H04N 19/70* (2014.01)
  *H04N 19/46* (2014.01)
  *H04N 19/30* (2014.01)
  *H04N 19/136* (2014.01)
  *H04N 19/172* (2014.01)

(52) U.S. Cl.
  CPC ............ *H04N 19/30* (2014.11); *H04N 19/46* (2014.11); *H04N 19/70* (2014.11)

(56) References Cited

U.S. PATENT DOCUMENTS

| | | | | |
|---|---|---|---|---|
| 8,078,644 | B2 * | 12/2011 | Hannuksela | G06F 17/30017 707/802 |
| 2004/0066854 | A1 * | 4/2004 | Hannuksela | H04N 19/70 375/240.27 |
| 2006/0083308 | A1 * | 4/2006 | Schwarz | H04N 19/0003 375/240.16 |
| 2007/0073779 | A1 * | 3/2007 | Walker | H04N 21/23439 |
| 2007/0088971 | A1 * | 4/2007 | Walker | H04L 1/0041 714/4.1 |
| 2007/0206673 | A1 * | 9/2007 | Cipolli | H04L 1/1607 375/240.1 |
| 2008/0170564 | A1 * | 7/2008 | Shi | H04N 21/23424 370/386 |
| 2009/0003439 | A1 | 1/2009 | Wang et al. | |
| 2010/0189182 | A1 * | 7/2010 | Hannuksela | H04N 21/234327 375/240.25 |
| 2010/0195712 | A1 * | 8/2010 | Yu | H04N 19/61 375/240.01 |
| 2010/0296000 | A1 * | 11/2010 | Henocq | H04N 21/234327 348/723 |
| 2011/0103474 | A1 * | 5/2011 | Thang | H04N 21/234327 375/240.12 |
| 2011/0150084 | A1 | 6/2011 | Choi et al. | |
| 2012/0023250 | A1 * | 1/2012 | Chen | H04N 21/234327 709/231 |
| 2012/0044322 | A1 * | 2/2012 | Tian | H04N 19/597 348/43 |
| 2012/0050475 | A1 * | 3/2012 | Tian | H04N 19/597 348/43 |
| 2012/0056981 | A1 * | 3/2012 | Tian | H04N 19/597 348/42 |
| 2012/0069135 | A1 * | 3/2012 | Cipolli | H04L 1/1607 348/14.08 |

FOREIGN PATENT DOCUMENTS

| | | |
|---|---|---|
| KR | 1020110115949 A | 10/2011 |
| KR | 1020110127175 A | 11/2011 |

OTHER PUBLICATIONS

Bross et al. (High Efficiency Video Coding (HEVC) Text Specification Draft 7, May 7, 2012), ("Bross").*
J. Samuelsson et al., "Temporal layer access pictures and CRA", 7. JCT-VC Meeting, Nov. 21-30, 2011, Geneva, CH, p. 1-5.
C. Kim et al., "AHG 9/10: Generalized definition of the TLA for scalable extension", 101. MPEG Meeting, Stockholm, SE, Jul. 11-20, 2012, p. 1-4.
R. Sjoberg et al., "Overview of HEVC high-level syntax and reference picture management" IEEE Transactions on Circuits and Systems fir Video Technology, Oct. 5, 2012, p. 1-14.

* cited by examiner

IMAGE DECODING METHOD USING INFORMATION ON A RANDOM ACCESS PICTURE AND APPARATUS USING SAME

This application is a 35 USC §371 National Stage entry of International Application No. PCT/KR2013/005524, filed on Jun. 24, 2013, which claims priority to and the benefit of U.S. Provisional Application No. 61/813,654, filed Apr. 19, 2013; 61/666,915, filed on Jul. 1, 2012 and 61/663,618, filed Jun. 24, 2012, the disclosures of which are incorporated herein by reference in their entirety.

TECHNICAL FIELD

The present invention relates to a video compression technique, and more particularly, to a method and an apparatus for performing scalable video coding (SVC).

BACKGROUND ART

In recent years, demands for high-resolution and high-quality videos have increased more and more in various fields of applications. As pictures have higher resolution and higher quality, the amount of information on the pictures also increases. With the increase in the amount of data, multi-functional devices and networks with various environments are introduced. With the development of the apparatuses having a variety of performance and the networks having various environments, the same contents may be used with different levels of quality.

Specifically, as terminals are able to support diverse qualities of pictures and various network environments are established, a picture with general quality is enabled in one environment while a higher-quality picture may be available in another environment.

For example, a user having purchased video contents through a mobile terminal can enjoy the video contents on a large-screen display with a higher resolution at his or her home.

In recent years, as high definition (HD) broadcast services are available, a large number of users are getting used to high-resolution and high-quality videos and service providers and service users also pay attention to ultrahigh-definition (UHD) services having a resolution four times higher than HDTV.

Thus, there is a need to provide scalability to video quality, for example, the image quality, resolution, size and frame rate of a video, based on high-efficiency encoding and decoding methods on a high-capacity video so as to offer varied qualities of video services in different environments for users' demands.

SUMMARY OF THE INVENTION

Technical Problems

An object of the invention is to provide a method and an apparatus capable of enhancing compression efficiency in scalable video encoding/decoding.

Another object of the invention is to provide a method and an apparatus for supporting random access to a video to enable switching between layers providing scalability.

Technical Solution

According to an aspect of the invention, there is provided a video decoding method. The video decoding method includes receiving a bitstream including information on a random access picture and predicting the random access picture and a subsequent picture following the random access picture in decoding order on the basis of the information on the random access picture.

The information on the random access picture may include information specifying whether a current picture is a picture indicating a random access point at which switching from a first layer to a second layer is possible.

According to another aspect of the invention, there is provided a video decoding apparatus. The video decoding apparatus includes a prediction module to receive a bitstream including information on a random access picture and to predict the random access picture and a subsequent picture following the random access picture in decoding order on the basis of the information on the random access picture.

The information on the random access picture may include information specifying whether a current picture is a picture indicating a random access point at which switching from a first layer to a second layer is possible.

Advantageous Effects

Scalable video coding provides a reference relationship for supporting random access which enables switching between all layers providing scalability. Further, a decoding apparatus is capable of determining a point where layer switching is performed using a random access point and properly decoding all pictures after layer switching is performed.

DESCRIPTION OF EMBODIMENTS

Figure 1:
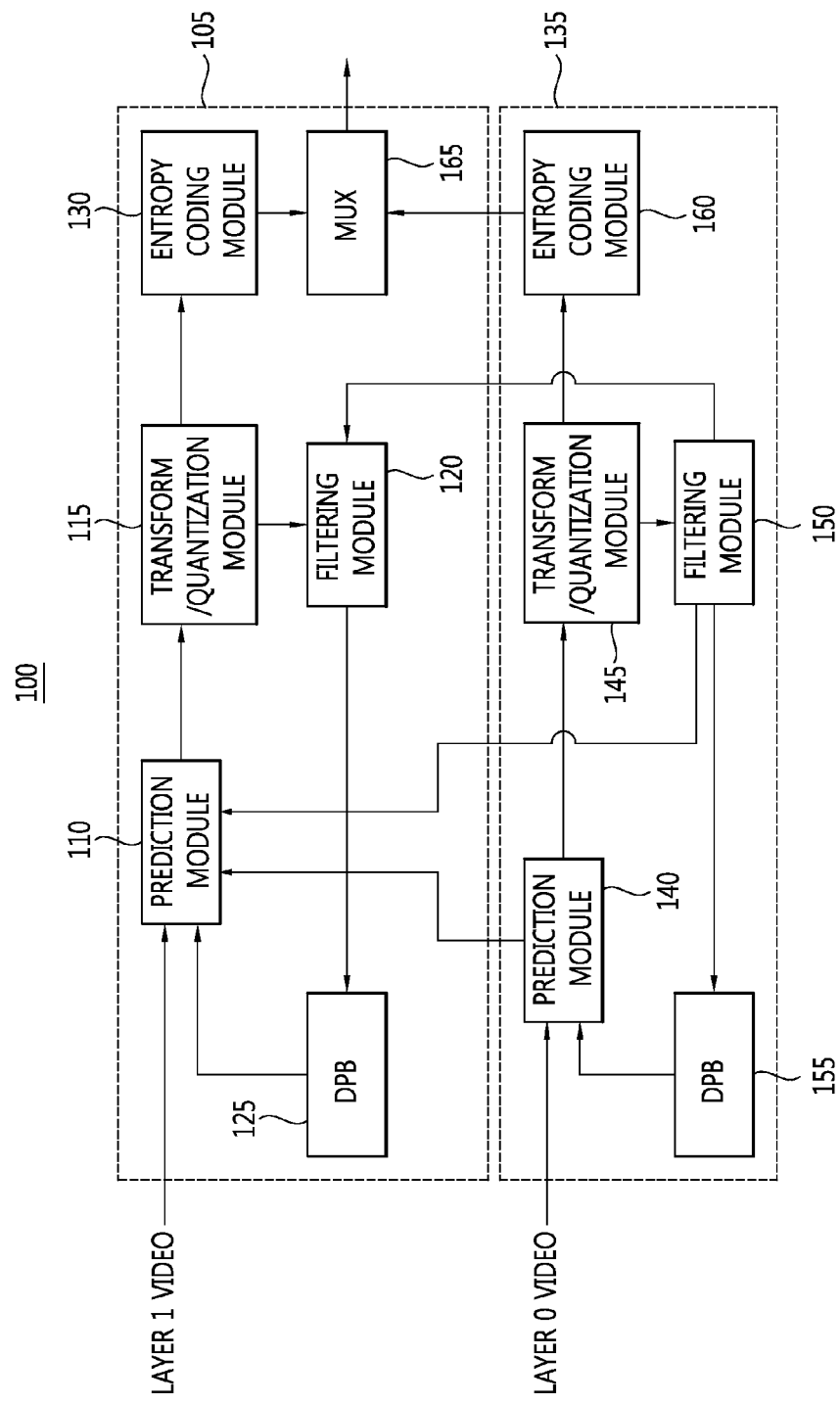
FIG. 1 is a block diagram schematically illustrating a video encoder that supports scalability according to an embodiment of the invention.

The present invention can be variously modified in various forms, and specific embodiments thereof will be described and shown in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding apparatus and does not mean that the elements are embodied by independent hardware or independent software. For example, two or more elements of the elements may be combined to form a single element, or one element may be divided into plural elements. The embodiments in which the elements are combined and/or divided belong to the scope of the invention without departing from the concept of the invention.

Hereinafter, exemplary embodiments of the invention will be described in detail with reference to the accompanying drawings. Like constituents in the drawings will be referenced by like reference numerals and will not be repeatedly described.

In a video coding method that supports scalability (hereinafter, referred to as "scalable coding"), input signals can be processed by layers. Depending on the layers, the input signals (input videos) may be different from each other in at least one of a resolution, a frame rate, a bit depth, a color format, and an aspect ratio.

In this description, scalable coding includes scalable encoding and scalable decoding.

In scalable encoding/decoding, it is possible to reduce duplicate transmission/processing of information and to enhance compression efficiency by performing inter-layer prediction using an inter-layer difference, that is, on the basis of scalability.

FIG. 1 is a block diagram schematically illustrating a video encoder that supports scalability according to an embodiment of the invention.

Referring to FIG. 1, the video encoder 100 includes an encoding module 105 for layer 1 and an encoding module 135 for layer 0.

Layer 0 may be a base layer, a reference layer or a lower layer, and layer 1 may be an enhancement layer, a current layer or an upper layer.

The encoding module 105 for layer 1 includes a prediction module 110, a transform/quantization module 115, a filtering module 120, a decoded picture buffer (DPB) 125, an entropy coding module 130, and a multiplexer (MUX) 165.

The encoding module 135 for layer 0 includes a prediction module 140, a transform/quantization module 145, a filtering module 150, a DPB 155, and an entropy coding module 160.

The prediction modules 110 and 140 may perform inter prediction and intra prediction on an input video. The prediction modules 110 and 140 may perform the predictions by predetermined processing units. The processing unit for prediction may be a coding unit (CU), a prediction unit (PU), or may be a transform unit (TU).

For example, the prediction modules 110 and 140 may determine whether to conduct inter prediction or intra prediction by CU, may determine a prediction mode by PU, and may perform prediction by PU or TU. Prediction to be performed includes construction of a predicted block and construction of a residual block (residual signal).

In the inter prediction, the prediction may be performed on the basis of information on at least one of a previous picture and/or a subsequent picture of a current picture to construct a predicted block. In the intra prediction, the prediction may be performed on the basis of information on a pixel in a current picture to construct a predicted block.

Examples of an inter prediction mode or method include a skip mode, a merge mode, a motion vector prediction (MVP) method. In the inter prediction, a reference picture for a current PU to be predicted may be selected and a reference block corresponding to the current PU may be selected from the reference picture. The prediction modules 110 and 140 may construct a predicted block on the basis of the reference block.

The predicted block may be constructed as an integer sample unit or as a fractional pixel unit. Here, a motion vector may also be represented in a fractional pixel.

Motion information in the inter prediction, that is, information such as an index, a motion vector and a residual signal of a reference picture, is entropy-encoded and is transmitted to a video decoder. When a skip mode is applied, the residual signal may not be created, transformed, quantized, and transmitted at all.

Prediction modes in the intra prediction may include 33 directional prediction modes and at least two non-directional modes. The non-directional modes may include a DC prediction mode and a planar mode. In the intra prediction, a predicted block may be constructed after a filter is applied to a reference sample.

A PU may be a block with various sizes and shapes. For example, in inter prediction, a PU may be a 2N×2N, 2N×N, N×2N or N×N block (where N is an integer). In intra prediction, a PU may be a 2N×2N or N×N block (where N is an integer). A PU with a size of N×N may be set to be applied only to a specific case. For example, the PU with the size of N×N may be set to be used only for a smallest CU or only for intra prediction. In addition to the PUs with the above-mentioned sizes, a PU may be further defined as an N×mN block, an mN×N block, a 2N×mN block, or an mN×2N block (where m<1) for use.

The prediction modules 110 and 140 may perform prediction for layer 1 using information on layer 0. In this specification, a process of predicting current layer information using another layer information is defined as an inter-layer prediction for convenience.

The current layer information predicted using the other layer information (that is, predicted by the inter-layer prediction) may include a texture, motion information, unit information, a predetermined parameter (for example, a filtering parameter), or the like.

The other layer information used for predicting the current layer information (that is, used for the inter-layer prediction) may include a texture, motion information, unit information, a predetermined parameter (for example, a filtering parameter), or the like.

As an example of the inter-layer prediction, an inter-layer unit parameter prediction may derive unit (CU, PU and/or TU) information on a base layer to be used as unit information on an enhancement layer or to determine unit information on an enhancement layer based on the unit information on the base layer.

Unit information may include information in each unit level. For instance, CU information may include information on partition (CU, PU and/or TU), information on transformation, information on prediction, and information on coding. PU information may include information on PU partition and information on prediction (for example, motion information and information on a prediction mode). TU information may include information on TU partition and information on transformation (transform coefficients and transform methods).

Unit information may include only partition information on a processing unit (for example, CU, PU, TU, etc.).

As another example of the inter-layer prediction, an inter-layer motion prediction is also referred to as an inter-layer inter prediction. According to the inter-layer inter prediction, prediction for a current block of layer 1 (current layer or enhancement layer) may be carried out using motion information on layer 0 (reference layer or base layer).

When the inter-layer inter prediction is employed, motion information on a reference layer may be scaled.

As still another example of the inter-layer prediction, an inter-layer texture prediction is also referred to as an inter-layer intra prediction or intra base layer (BL) prediction. The inter-layer texture prediction may be employed when a reference block in a reference layer is reconstructed by intra prediction.

The inter-layer intra prediction may use a texture of a reference block in a reference layer as a predictive value for a current block in an enhancement layer. Here, the texture of the reference block may be scaled by upsampling.

As yet another example of the inter-layer prediction, an inter-layer parameter prediction may derive a parameter used in a base layer to be reused for an enhancement layer or may predict a parameter for the enhancement layer based on the parameter used in the base layer.

Although the inter-layer texture prediction, the inter-layer motion prediction, the inter-layer unit information prediction and the inter-layer parameter prediction have been illustrated above as an inter-layer prediction, alternative inter-layer predictions may also be applicable to the present invention, without limiting thereto.

For example, the prediction modules may conduct an inter-layer residual prediction of predicting a residual of a current layer using residual information on another layer and performing prediction for a current block in the current layer based on the residual.

Further, the prediction modules may conduct an inter-layer differential prediction of performing prediction for a current block in a current layer using a differential picture between pictures obtained by upsampling or downsampling a reconstructed picture of the current layer and a reconstructed picture of another layer.

The transform/quantization modules 115 and 145 may transform the residual block by TU to create transform coefficients and may quantize the transform coefficients.

A transform block is a rectangular block of samples to which the same transformation is applied. The transform block may be a TU and may have a quad-tree structure.

The transform/quantization modules 115 and 145 may perform transformation based on a prediction mode applied to the residual block and a size of the transform block and a size of the transform block to create a two-dimensional (2D) array of transform coefficients. For example, when intra prediction is applied to the residual block and the residual block has a 4×4 array, the residual block may be transformed using discrete sine transform (DST). Otherwise, the residual block may be transformed using discrete cosine transform (DCT).

The transform/quantization modules 115 and 145 may fixedly use a specific transformation regardless of a prediction mode and the size of the transform block. For example, the transform/quantization modules 115 and 145 may apply only DST to all transform blocks. Alternatively, the transform/quantization modules 115 and 145 may apply only DCT to all transform blocks.

The transform/quantization modules 115 and 145 may quantize the transform coefficients to create the quantized transform coefficients.

The transform/quantization modules 115 and 145 may transmit the quantized transform coefficients to the entropy coding modules 130 and 160. Here, the transform/quantization modules 115 and 145 may rearrange the 2D array of the quantized transform coefficients into a one-dimensional (1D) array in a predetermined scan order and may transmit the rearranged 1D array to the entropy coding modules 130 and 160. The transform/quantization modules 115 and 145 may transmit a reconstructed block generated on the basis of the residual block and the predicted block to the filtering modules 120 and 150 for inter prediction, without being transformation/quantization.

If necessary, the transform/quantization modules 115 and 145 may skip transformation and perform only quantization or may skip both transformation and quantization. For example, the transform/quantization modules 115 and 145 may skip transformation for a block involving a specific prediction method or having a specific size, or a block involving a specific prediction block and having a specific size.

The entropy coding modules 130 and 180 may perform entropy encoding on the quantized transform coefficients. An encoding method, such as exponential Golomb coding and context-adaptive binary arithmetic coding (CABAC), may be used for entropy encoding.

The filtering modules 120 and 150 may apply a deblocking filter, an adaptive loop filter (ALF), or a sample adaptive offset (SAO) to a reconstructed picture.

The deblocking filter may remove a block distortion generated on boundaries between blocks in the reconstructed picture. The ALF may perform a filtering process on the basis of a resulting value of comparing the original picture with the reconstructed picture of which the blocks are filtered by the deblocking filter. The SAO may reconstruct an offset difference by pixel between the residual block having been subjected to the deblocking filter and the original picture and is applied in a form of a band offset, an edge offset, or the like.

The filtering modules 120 and 150 may not apply all of the deblocking filter, the ALF and the SAO, but may apply only the deblocking filter, may apply only the deblocking filter and the ALF, or may apply only the deblocking filter and the SAO.

The DPBs 125 and 155 may receive and store the reconstructed block or the reconstructed picture from the filtering modules 120 and 150. The DPB 125 and 155 may provide the reconstructed block or picture to the prediction modules 110 and 140 that perform inter prediction.

Information output from the entropy coding module 160 for layer 0 and information output from the entropy coding module 130 for layer 1 may be multiplexed by the MUX 165 and may be output as a bitstream.

Although the encoding module 105 for layer 1 has been described to include the MUX 165 for convenience, the MUX may be a device or module independent of the encoding module 105 for layer 1 and the encoding module 135 for layer 0.

Figure 2:
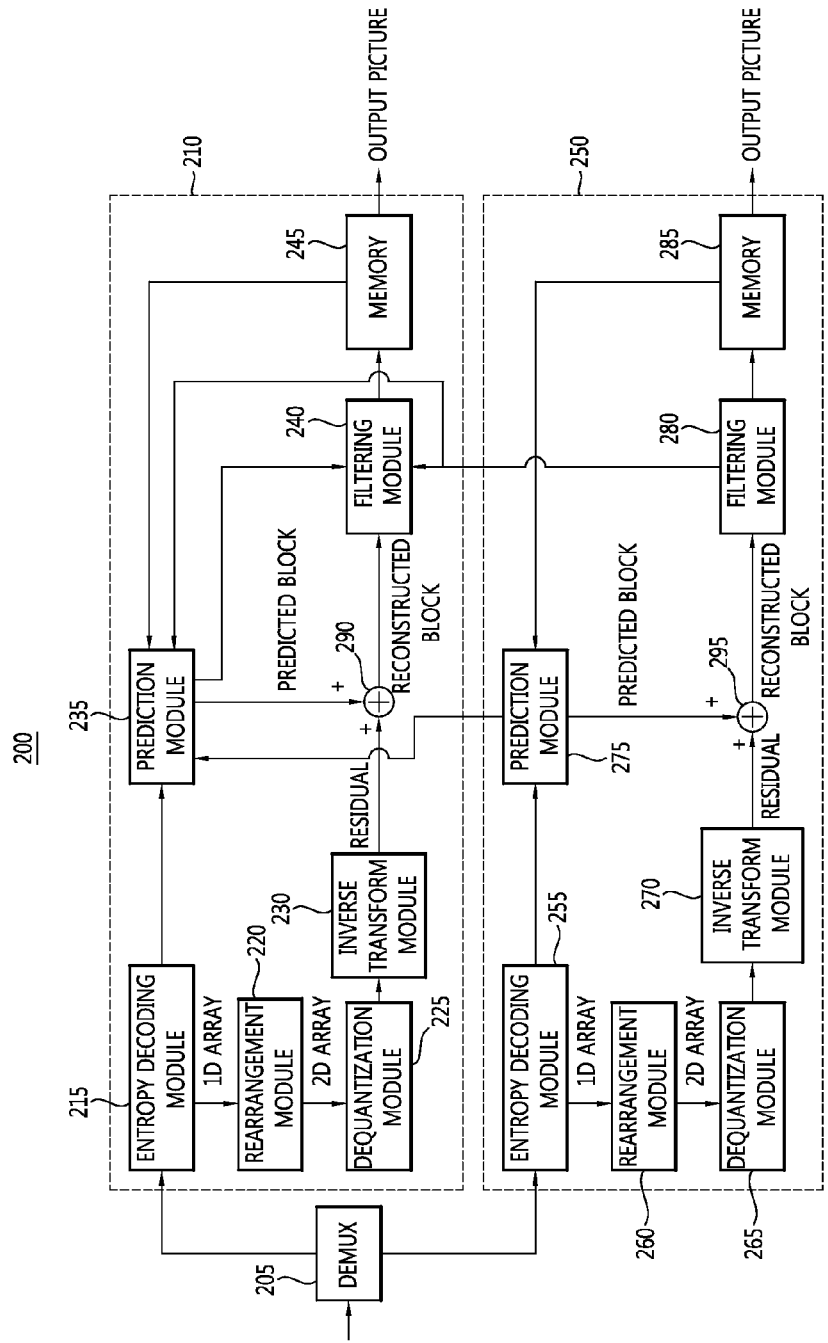
FIG. 2 is a block diagram schematically illustrating a video decoder that supports scalability according to an embodiment of the invention.

FIG. 2 is a block diagram schematically illustrating a video decoder that supports scalability according to an embodiment of the invention.

Referring to FIG. 2, the video decoder 200 includes a decoding module 210 for layer 1 and a decoding module 250 for layer 0.

Layer 0 may be a base layer, a reference layer or a lower layer, and layer 1 may be an enhancement layer, a current layer or an upper layer.

The decoding module 210 for layer 1 may include an entropy decoding module 215, a rearrangement module 220, a dequantization module 225, an inverse transform module 230, a prediction module 235, a filtering module 240, and a memory 245.

The decoding module 250 for layer 0 may include an entropy decoding module 255, a rearrangement module 260, a dequantization module 265, an inverse transform module 270, a prediction module 275, a filtering module 280, and a memory 285.

When a bitstream including video information is transmitted from the video encoder, a demultiplexer (DEMUX) 205 may demultiplex the information by layers and may transmit the information to decoders by layers.

The entropy decoding modules 215 and 255 may perform entropy decoding corresponding to an entropy coding method used in the video encoder. For example, when CABAC is used in the video encoder, the entropy decoding modules 215 and 255 may perform entropy decoding using CABAC.

Information for constructing a predicted block out of information decoded by the entropy decoding modules 215 and 255 may be provided to the prediction modules 235 and 275, and residual values entropy-decoded by the entropy decoding modules 215 and 255, that is, quantized transform coefficients, may be input to the rearrangement modules 220 and 260.

The rearrangement modules 220 and 260 may rearrange the information of the bitstream entropy-decoded by the entropy decoding modules 215 and 255, that is, the quantized transform coefficients, on the basis of a rearrangement method used in the video encoder.

For example, the rearrangement modules 220 and 260 may rearrange a 1D array of the quantized transform coefficients back into a 2D array of coefficients. The rearrangement modules 220 and 260 may perform scanning on the basis of a prediction mode applied to a current block (transform block) and/or a size of the transform block to construct a 2D array of coefficients (quantized transform coefficients).

The dequantization modules 225 and 265 may perform dequantization on the basis of a quantization parameter transmitted from the video encoder and the rearranged coefficients of the block to create transform coefficients.

The dequantization modules 225 and 265 may transmit the entropy-decoded residual values to the inverse transform modules 230 and 270, without dequantizing the residual values, depending on a predetermined condition or depending on a quantization method used for the video encoder.

The inverse transform modules 230 and 270 may perform inverse transformation of transformation performed by a transform module of the video encoder on the transform coefficients. The inverse transform modules 230 and 270 may perform inverse DCT and/or inverse DST of DCT and DST performed by the video encoder.

In the video encoder, DCT and/or DST may be selectively performed depending on a plurality of information pieces, such as a prediction method, a size of a current block and a prediction direction, and the inverse transform modules 230 and 270 of the video decoder may perform inverse transformation on the basis of transform information used by the video decoder.

For example, the inverse transform modules 230 and 270 may perform inverse DCT and inverse DST depending on a prediction mode/block size. Specifically, the inverse transform modules 230 and 270 may perform inverse DST on a 4×4 luma block to which intra prediction has been applied.

Alternatively, the inverse transform modules 230 and 270 may fixedly use a specific inverse transformation method regardless of a prediction mode/block size. For example, the inverse transform modules 230 and 270 may apply only inverse DST to all transform blocks. The inverse transform modules 230 and 270 may also apply only inverse DCT to all transform blocks.

The inverse transform modules 230 and 270 may inversely transform the transform coefficients or a block of the transform coefficients to construct a residual signal or a residual block.

The inverse transform modules 230 and 270 may skip transformation if necessary or depending on an encoding method used for the video encoder. For example, the inverse transform modules 230 and 270 may skip transformation for a block involving a specific prediction method or having a specific size, or a block involving a specific prediction block and having a specific size.

The prediction modules 235 and 275 may construct a predicted block of the current block on the basis of predicted block construction information provided from the entropy decoding modules 215 and 255 and information on a previously decoded block and/or picture provided from the memories 245 and 285.

When a prediction mode for the current block is an intra prediction mode, the prediction modules 235 and 275 may perform intra prediction on the current block on the basis of information on a pixel in a current picture.

When the prediction mode for the current block is an inter prediction mode, the prediction modules 235 and 275 may perform inter prediction on the current block on the basis of information included in at least one of a previous picture and a subsequent picture of the current picture. Part or all of motion information necessary for inter prediction may be derived based on information received from the video encoder.

When the skip mode is used as an inter prediction mode, the residual may not be transmitted from the video encoder and the predicted block may be used as a reconstructed block.

The prediction module 235 for layer 1 may perform inter prediction or intra prediction using only information in layer 1 and may perform inter-layer prediction using information on another layer (layer 0).

For instance, the prediction module 235 for layer 1 may perform prediction for the current block using one of motion information on layer 1, texture information on layer 1, unit information on layer 1 and parameter information on layer 1. The prediction module 235 for layer 1 may also perform prediction for the current block using a plurality of information pieces among the motion information on layer 1, the texture information on layer 1, the unit information on layer 1 and the parameter information on layer 1.

The prediction module 235 for layer 1 may receive the motion information on layer 1 from the prediction module 275 for layer 0 and may perform motion prediction. The inter-layer motion prediction is also referred to as an inter-layer inter prediction. By the inter-layer motion prediction, prediction for the current block in the current layer (enhancement layer) may be performed using the motion information on the reference layer (base layer). If necessary, the prediction module 235 may scale and use the motion information on the reference layer.

The prediction module 235 for layer 1 may receive the texture information on layer 1 from the prediction module 275 for layer 0 and may perform texture prediction. The texture prediction is also referred to as an inter-layer intra prediction or intra base layer (BL) prediction. The texture prediction may be employed when a reference block in a reference layer is reconstructed by intra prediction. In the inter-layer intra prediction, a texture of a reference block in a reference layer may be used as a predictive value for the current block in the enhancement layer. Here, the texture of the reference block may be scaled by upsampling.

The prediction module 235 for layer 1 may receive unit parameter information on layer 1 from the prediction module 275 for layer 0 and may perform unit parameter prediction. By the unit parameter prediction, unit (CU, PU, and/or TU) information on the base layer may be used as unit information on the enhancement layer or unit information on the enhancement layer may be determined on the basis of the unit information on the base layer.

The prediction module 235 for layer 1 may receive filtering parameter information on layer 1 from the prediction module 275 for layer 0 and may perform parameter prediction. By the parameter prediction, a parameter used for the base layer may be derived to be reused for the enhancement layer or a parameter for the enhancement layer may be predicted on the basis of the parameter used for the base layer.

Adders 290 and 295 may construct a reconstructed block using the predicted block constructed by the prediction modules 235 and 275 and the residual block constructed by the inverse transform modules 230 and 270. In this case, the adders 290 and 295 may be considered as separate modules (reconstructed block constructing module) that construct a reconstructed block.

The block and/or picture reconstructed by the adders 290 and 295 may be supplied to the filtering modules 240 and 280.

The filtering modules 240 and 280 may apply a deblocking filter, an SAO, and/or an ALF to the reconstructed block and/or picture.

The filtering modules 240 and 280 may not apply all of the deblocking filter, the ALF and the SAO, but may apply only the deblocking filter, may apply only the deblocking filter and the ALF, or may apply only the deblocking filter and the SAO.

Referring to FIG. 2, the filtering module 240 for layer 1 may perform a filtering operation on the reconstructed picture using the parameter information transmitted from the prediction module 235 for layer 1 and/or the filtering module 280 for layer 1. For example, the filtering module 240 for layer 1 may perform a filtering operation on layer 1 or an inter-layer filtering operation using a parameter predicted from a filtering parameter applied to layer 0.

The memories 245 and 285 may store the reconstructed block or picture for use as a reference picture or reference block. The memories 245 and 285 may output the reconstructed picture stored in the memories 245 and 285 via a predetermined output module (not shown) or a display (not shown).

Although FIG. 2 illustrates the rearrangement modules, the dequantization modules and the inverse transform modules as independent modules, the video decoder may also be configured to enable the dequantization/inverse transform modules as a single module to sequentially perform rearrangement, dequantization, and inverse transform like the video encoder of FIG. 1.

Although FIGS. 1 and 2 illustrate the prediction modules, the prediction module for layer 1 may include an inter-layer prediction module that performs a prediction process using information on another layer (layer 0) and an inter/intra prediction module that performs a prediction process without using information on another layer (layer 0).

Figure 3:
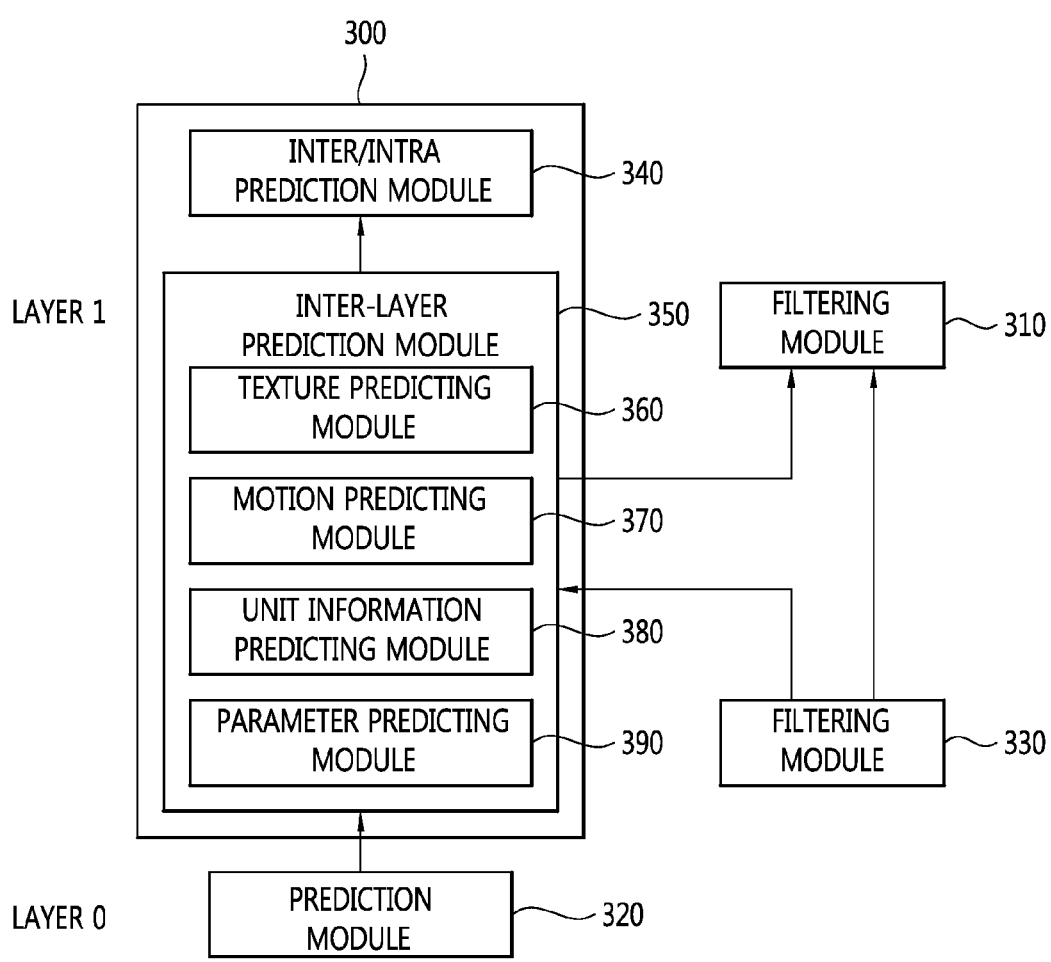
FIG. 3 is a block diagram illustrating an example of inter-layer prediction in a video encoder and in a video decoder that perform scalable coding according to the invention.

FIG. 3 is a block diagram illustrating an example of inter-layer prediction in a video encoder and a video decoder that perform scalable coding according to the invention.

Referring to FIG. 3, a prediction module 300 for layer 1 includes an inter/intra prediction module 340 and an inter-layer prediction module 350.

The prediction module 300 for layer 1 may perform inter-layer prediction necessary for predicting layer 1 from information on layer 0.

For example, the inter-layer prediction module 350 may receive the information on layer 0 from a prediction module 320 and/or a filtering module 330 for layer 0 and may perform inter-layer prediction necessary for predicting layer 1.

The inter/intra prediction module 340 for layer 1 may perform inter prediction or intra prediction using information on layer 1, without using the information on layer 0.

The inter/intra prediction module 340 for layer 1 may also perform prediction based on the information on layer 0 using information transmitted from the inter-layer prediction module 350.

In addition, a filtering module 310 for layer 1 may perform filtering on the basis of the information on layer 1 or may perform filtering on the basis of the information on layer 0. The information on layer 0 may be transmitted from the filtering module 330 for layer 0 to the filtering module 310 for layer 1 or may be transmitted from the inter-layer prediction module 350 for layer 1 to the filtering module 310 for layer 1.

Meanwhile, information transmitted from layer 0 to the inter-layer prediction module 350 may be at least one of information on a unit parameter of layer 0, motion information on layer 0, texture information on layer 0, and filter parameter information on layer 0.

For convenience of description, suppose that the inter-layer prediction module 350 has a sub-prediction module for predicting individual inter-layer information.

For instance, the inter-layer prediction module 350 may include a texture predicting module 360, a motion predicting module 370, a unit information predicting module 380 and a parameter predicting module 390.

The texture predicting module 360 may use a texture of a reference block in a reference layer as a predictive value for a current block in an enhancement layer when the reference block in the reference layer is reconstructed by intra prediction. Here, the texture predicting module 360 may scale the texture of the reference block using upsampling.

The motion predicting module 370 may conduct prediction for the current block in layer 1 (current layer or enhancement layer) using motion information on layer 0 (reference layer or base layer). Here, the motion predicting module 370 may scale the motion information on the reference layer.

The unit information predicting module 380 may derive unit (CU, PU, and/or TU) information on the base layer to be used as unit information on the enhancement layer or may determine unit information on the enhancement layer on the basis of the unit information on the base layer.

The parameter predicting module 390 may derive a parameter used for the base layer to be reused for the enhancement layer or may predict a parameter for the enhancement layer on the basis of the parameter used for the base layer.

Although inter-layer texture prediction, inter-layer motion prediction, inter-layer unit information prediction and inter-layer parameter prediction have been illustrated above as an inter-layer prediction, alternative inter-layer predictions may also be applicable to the present invention, without limiting thereto.

For example, the inter-layer prediction module may further include a sub-prediction module for conducting inter-layer residual prediction and/or a sub-prediction module for conducting inter-layer differential prediction, or a combination of the foregoing sub-prediction modules may conduct inter-layer residual prediction and inter-layer differential prediction.

If an encoder has a configuration illustrated in FIG. 3, in layer 1, the prediction module 300 may correspond to the prediction module 110 of FIG. 1, and the filtering module 310 may correspond to the filtering module 120 of FIG. 1. In layer 0, the prediction module 320 may correspond to the prediction module 140 of FIG. 1, and the filtering module 330 may correspond to the filtering module 150 of FIG. 1.

If a decoder has the configuration illustrated in FIG. 3, in layer 1, the prediction module 300 may correspond to the prediction module 235 of FIG. 2, and the filtering module 310 may correspond to the filtering module 240 of FIG. 2. In layer 0, the prediction module 320 may correspond to the prediction module 140 275 FIG. 2, and the filtering module 330 may correspond to the filtering module 280 of FIG. 2.

In scalable video coding, inter-layer prediction of predicting information on a current layer using information on another layer may be performed.

Figure 4:
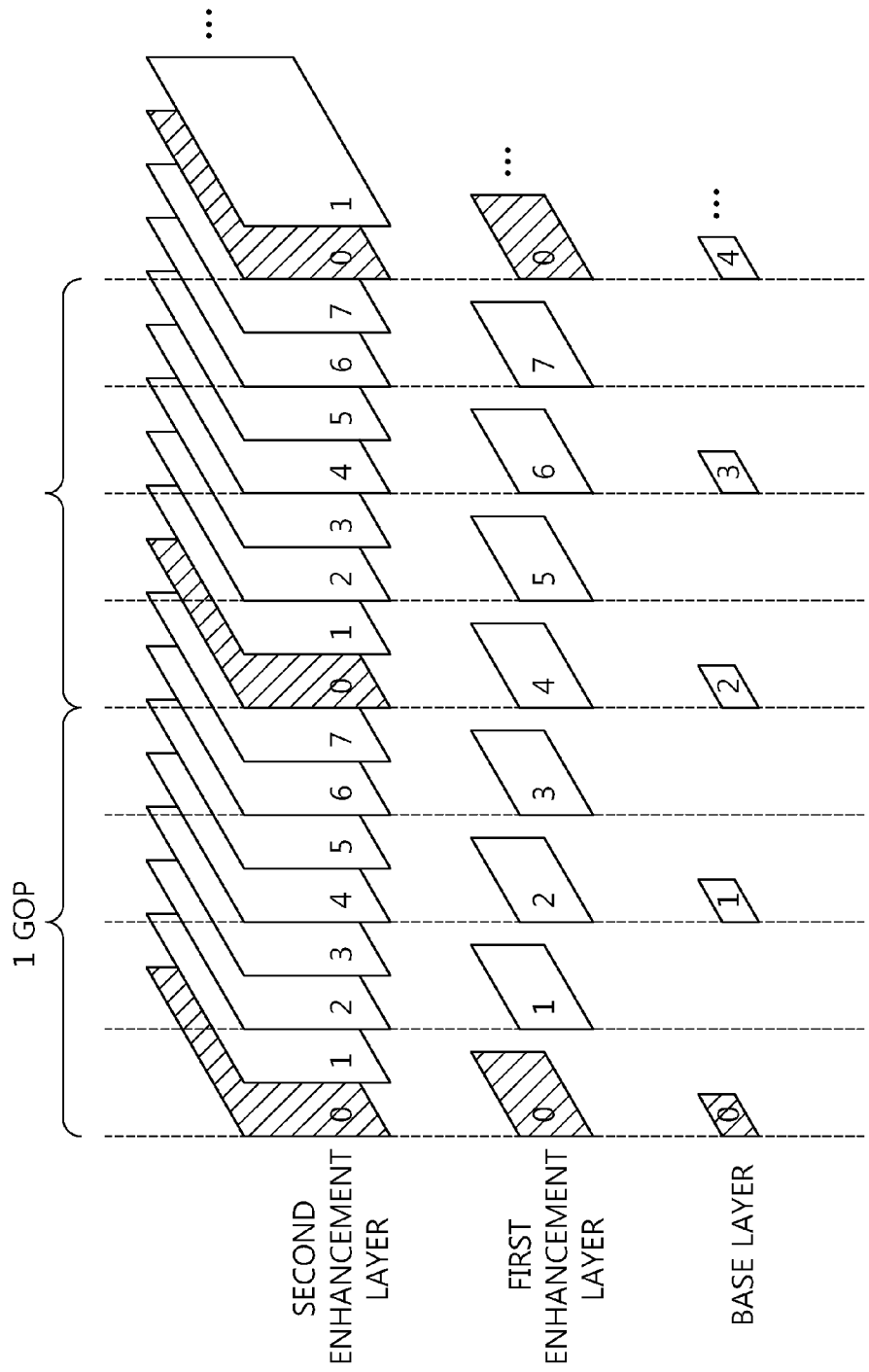
FIG. 4 is a conceptual diagram schematically illustrating a scalable video coding structure using a plurality of layers according to an embodiment of the invention.

FIG. 4 is a conceptual diagram schematically illustrating a scalable video coding structure using a plurality of layers according to an embodiment of the invention. In FIG. 4, Group of Picture (GOP) denotes a picture group, that is, a group of pictures.

In order to transmit video data, a transmission medium is needed, and performance thereof is different by each transmission medium according to various network environments. For application to various transmission media or network environments, a scalable video coding method may be provided.

The scalable video coding method is a coding method which utilizes texture information, motion information, residual signals between layers, or the like to remove redundancy between layers, thus improving encoding and decoding performance. The scalable video coding method may provide scalability in various spatial, temporal, and quality aspects according to ambient conditions such as a transmission bit rate, a transmission error rate, and a system resource.

Scalable video coding may be performed by using a multi-layer structure so as to provide a bit stream applicable to various network situations. For example, the scalable video coding structure may include a base layer in which video data is compressed and processed using a general video decoding method, and also include an enhancement layer in which video data is compressed and processed using both decoding information of the base layer and a general video decoding method.

Here, a layer refers to a set of pictures and bitstreams that are classified according to a spatial aspect (for example, picture size), a temporal aspect (for example, decoding order, picture output order and frame rate), picture quality, complexity, or the like. The base layer may refer to a reference layer or a basic layer, and the enhancement layer may refer to an enhancing layer or a higher layer. A plurality of layers may have dependency on each other.

Referring to FIG. 4, for example, the base layer may be defined by standard definition (SD), 15 Hz frame rate and 1 Mbps bit rate, a first enhancement layer may be defined by high definition (HD), 30 Hz frame rate and 3.9 Mbps bit rate, and a second enhancement layer may be defined by 4K-ultra high definition (UHD), 60 Hz frame rate and 27.2 Mbps.

These formats, frame rates and bit rates are provided only for illustrative purposes and may be changed and modified as needed. Also, a number of used layers may change depending on circumstances, without being limited to the present embodiment. For instance, when a transmission bandwidth is 4 Mbps, the first enhancement layer HD may be transmitted at a frame rate reduced to 15 Hz or lower.

The scalable video coding method may provide spatial, temporal, and quality scalabilities using the method described above with reference to FIG. 4.

Scalable video coding refers to scalable video encoding in encoding, and to scalable video decoding in a decoding.

Figure 5:
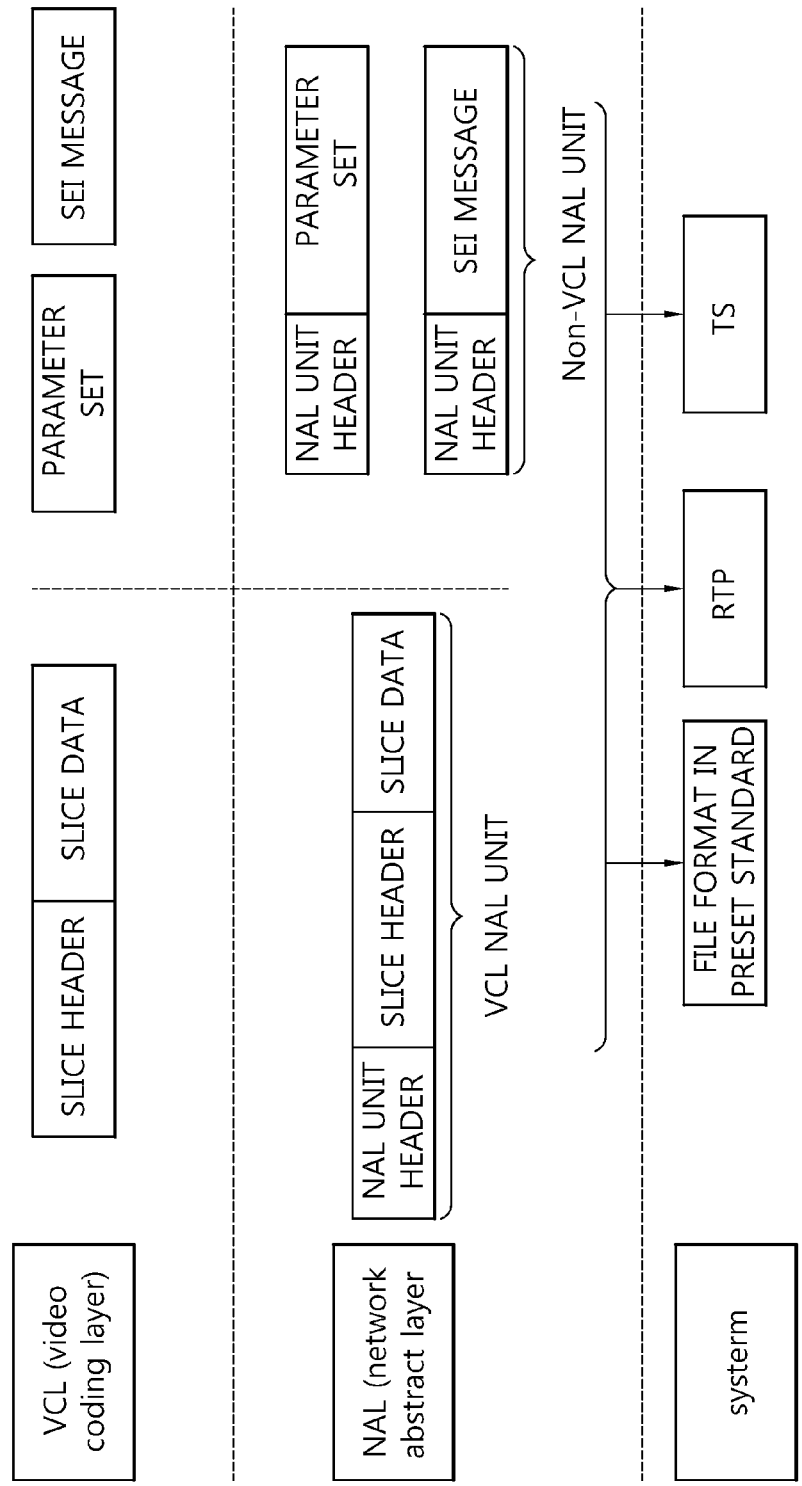
FIG. 5 illustrates a layer structure of a coded video processed by a decoder.

FIG. 5 illustrates a layer structure of a coded video processed by a decoder.

The coded video is divided into a video coding layer (VCL) responsible for decoding a video and dealing with the video itself, a lower system for transmitting and storing encoded information, and a network abstraction layer (NAL) located between the VCL and the lower system and conducting a network adaptation function.

An NAL unit as a basic unit of the NAL serves to map the coded video onto a bit string of the lower system, such as a file format (for example, H.264/AVC file format) in accordance with a preset standard, a real-time transport protocol (RTP) and a transport stream (TS).

An NAL unit includes two parts of an NAL unit header and a raw byte sequence payload (RBSP, resulting data from video compression) generated in the VCL. The NAL unit header includes information on a type of the corresponding NAL unit.

A NAL unit is divided into a VCL NAL unit and a non-VCL NAL unit depending on the RBSP generated in the VCL. The VCL NAL unit is an NAL unit including the information on the video, and the non-VCL NAL unit is an NAL unit including the information (parameter set or supplemental enhancement information (SEI) message) needed for decoding the video.

A VCL NAL unit may be divided into different types according to properties and types of a picture included in an NAL unit.

The VCL may generate VCL data including information (slice data) on the video or generate a parameter set corresponding to a header, such as a picture parameter set (PPS), a sequence parameter set (SPS) and a video parameter set (VPS) or an SEI message additionally needed for decoding the video.

Figure 6:
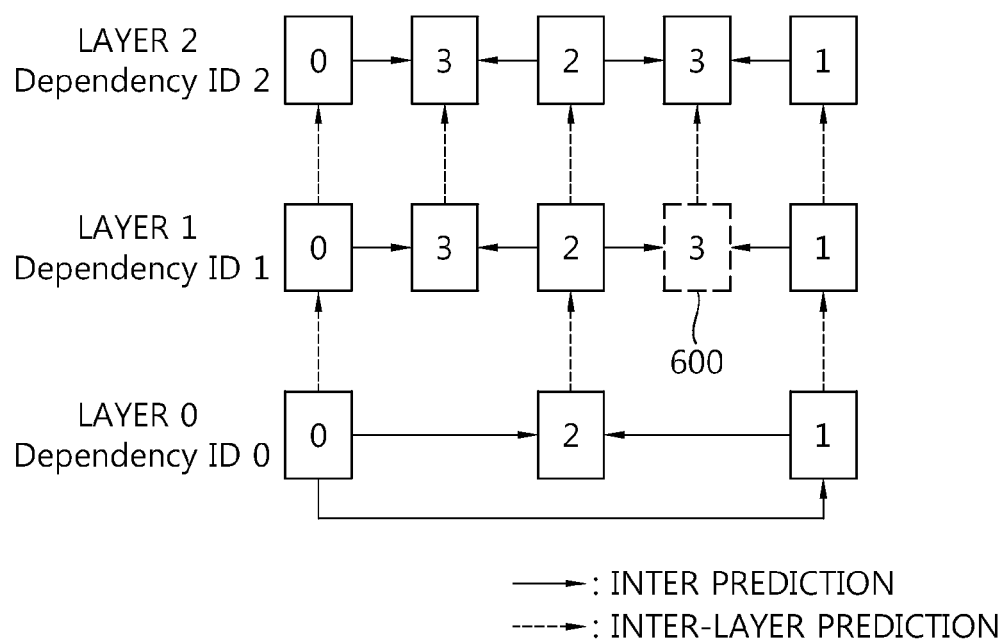
FIG. 6 schematically illustrates a layer structure of scalable coding.

FIG. 6 schematically illustrates a layer structure of scalable coding.

The layer structure of scalable coding may provide temporal spatial, quality and complexity scalabilities and includes syntax information for these scalabilities.

For example, when the layer structure supports temporal scalability, the layer structure may include a plurality of temporal layers, wherein a temporal layer may be specified by temporal_id. When the layer structure supports spatial scalability, the layer structure may include a plurality of spatial layers, wherein a spatial layer may be specified by dependency_id. When the layer structure supports quality scalability, the layer structure may include a plurality of quality layers, wherein a quality layer may be specified by quality_id.

The scalable coding structure of FIG. 6 supports spatial scalability, and each layer (layer 0, layer 1 and layer 2) is specified by dependency_id so as to represent a spatial scalability layer.

Further, the scalable coding structure of FIG. 6 supports temporal scalability, and each layer is specified by temporal_id so as to represent a temporal scalability layer.

For example, layer 0 may be a base layer (basic layer), and layer 1 and layer 2 may be enhancement layers (enhancing layers). Here, layer 0 may support lowest spatial scalability and have dependency_id specified by 0. Layer 2 may support highest spatial scalability and have dependency_id specified by 2.

In addition, each layer (layer 0, layer 1 and layer 2) may include a plurality of temporal layers (temporal sub-layers) to provide temporal scalability, and the temporal layers may be specified by temporal_id. For instance, a temporal layer supporting lowest temporal scalability may have temporal_id specified by 0, and a temporal layer supporting higher temporal scalability may have temporal_id specified by a value greater than 0.

A box shown in FIG. 6 represents a picture, and a number in the box represents temporal_id. An arrow represents a reference relationship indicating whether a picture is allowed to use another picture as a reference picture. A solid-line arrow represents a reference relationship for inter prediction, and a dotted-line arrow represents a reference relationship for inter-layer prediction.

Meanwhile, in the scalable coding structure shown in FIG. 6, a layer for receiving a video may change on user selections or changes in video transmission environments. For example, only the base layer (for example, layer 0) may be used to receive and decode a video in an inferior network environment, and even higher layers (enhancement layers, for example, layer 1 and layer 2) may also be used to receive and decode a video when the network environment becomes better. Such switching between layers (layer switching) may be limited by reference relationships in video coding.

Here, switching between layers, that is, layer switching, refers to a switch from a current layer to another layer. For example, switching from the current layer to a higher layer than the current layer may be referred to as up-switching, while switching from the current layer to a lower layer than the current layer may be referred to as down-switching.

For example, referring to FIG. 6, pictures with temporal_id of 0, 1 and 2 in layer 1 are used for reference picture for decoding a picture with temporal_id of 3. Such a reference relationship makes it impossible to achieve switching between layers, that is, layer switching, at a position of the picture 600 with temporal_id of 3 in layer 1, indicated by a dotted line.

Thus, an NAL unit type for indicating a position at which layer switching is possible (also "layer switching possible position") is defined. Such an NAL unit type may be a temporal layer access (TLA) picture. A TLA picture may be also referred to as a temporal sub-layer access (TSA) picture.

A TLA picture is a picture indicating a layer switching possible position in a multi-temporal layer structure supporting temporal scalability. When an NAL unit type (nal_unit_type) of all VCL NAL units of a specific picture has a value of 3, the specific picture may be a TLA picture. Here, a TLA picture and pictures to be decoded subsequent to the TLA picture may have constraints on reference relationships as follows.

A TLA picture and pictures following the TLA picture in decoding order but having temporal_id the same as or greater than temporal_id of the TLA picture are not allowed to use a picture preceding the TLA picture in decoding order but having temporal_id the same as or greater than temporal_id of the TLA picture as a reference picture in inter prediction. The TLA picture may not be a tagged for discard (TFD) picture. Thus, the TLA picture may be a non-TFD TLA picture.

Here, a TFD picture means a un-decodable leading picture, which may be discarded. A TFD picture refers to a picture not normally decoded as if referring to an unavailable reference picture and is excluded in decoding and output processes.

Figure 7:
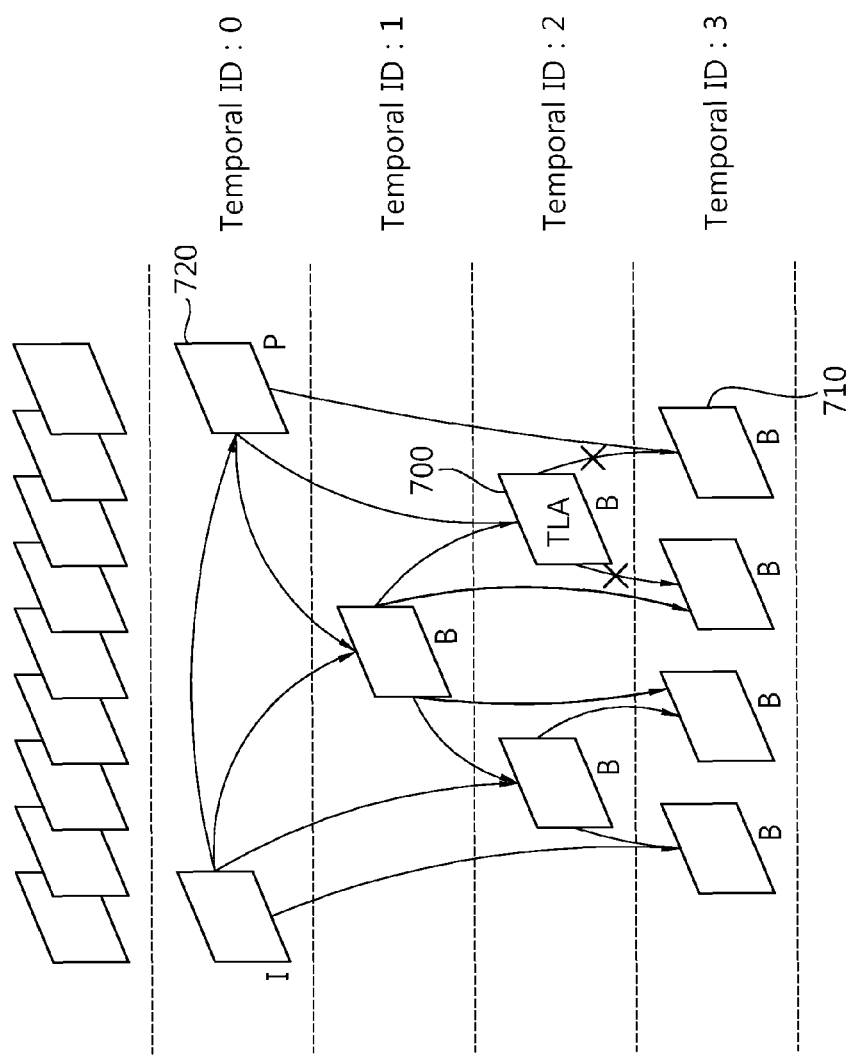
FIG. 7 illustrates a temporal layer access (TLA) picture.

FIG. 7 illustrates a TLA picture.

A layer structure of scalable coding shown in FIG. 7 includes four temporal layers supporting temporal scalability. Here, a temporal layer supporting lowest temporal scalability may have temporal_id of 0, and a temporal layer supporting highest temporal scalability may have temporal_id of 3. That is, temporal_id having a higher value supports higher temporal scalability.

Referring to FIG. 7, temporal_id of the TLA picture 700 is 2. Here, as described above, the TLA picture and pictures to be decoded subsequent to the TLA picture are not allowed to use a picture having temporal_id the same as or greater than that of the TLA picture 700 as a reference picture, and thus the pictures decoded subsequent to the TLA picture 700 is allowed to use only a picture having temporal_id smaller than 2 as a reference picture.

For instance, a picture 710 decoded subsequent to the TLA picture 700 in decoding order is not allowed to use the picture 700 with temporal_id of 2 as a reference picture but may use a picture 720 with temporal_id of 0 as a reference picture.

As described above, when temporal_id of the TLA picture 700 is 2, pictures decoded subsequent to the TLA picture 700 use only pictures with temporal_id of 0 and 1 as reference pictures and thus have no reference relationship with pictures with temporal_id of 2. Thus, the pictures decoded subsequent to the TLA picture 700 have more layer switching possible positions, that is, random access possible positions. A switch (that is, layer switching) from a picture with temporal_id of 1 immediately to a picture with temporal_id of 3 is possible.

As described above, a TLA picture is a picture for indicating switching between temporal layers. Thus, there is needed a method of indicating a random access point at which switching between all layers is possible in a scalable coding structure supporting spatial and quality scalabilities in addition to temporal scalability.

Hereinafter, the invention will illustrate a method of enabling switching (that is, random access) between all layers (for example, temporal, spatial and quality layers) constructed to support temporal, spatial and quality scalabilities in scalable coding.

A scalable coding structure according to an embodiment of the invention provides an NAL unit type for indicating a position at which a random access is possible between all layers, such as a temporal layer as a layer of a bitstream temporally scalable, a spatial layer as a layer of a bitstream spatially scalable and a quality layer as a layer of a bitstream scalable in quality.

In the embodiment, a spatial layer access or scalable layer access (SLA) picture is provided as an NAL unit type for indicating a random access point at which switching between layers for providing temporal, spatial and quality scalabilities is possible.

The SLA picture or pictures decoded subsequent to the SLA picture may have reference relationships determined according to the following rules so as to perform a random access function.

1. In inter prediction, a picture having temporal_id the same as or greater than temporal_id of the SLA picture is not used as a reference picture. That is, a picture having temporal_id smaller than temporal_id of the SLA picture is available as a reference picture.

2. In inter-layer prediction, a picture having dependency_id smaller than or the same as dependency_id of the SLA picture is available a reference picture, and a picture having quality_id smaller than or the same as quality_id of the SLA picture is available a reference picture.

In addition, the SLA picture according to the embodiment may be applied as follows.

1. Use SLA picture dependently between spatial and quality layers

For example, when layer_id (dependency_id or quality_id) of the SLA picture is 1, all layers having layer_id greater than 1 may depend on the SLA picture.

2. Use SLA picture independently between spatial and quality layers

For example, reference relationships of the SLA picture may be applied to each of the spatial layer and the quality layer.

Figure 8:
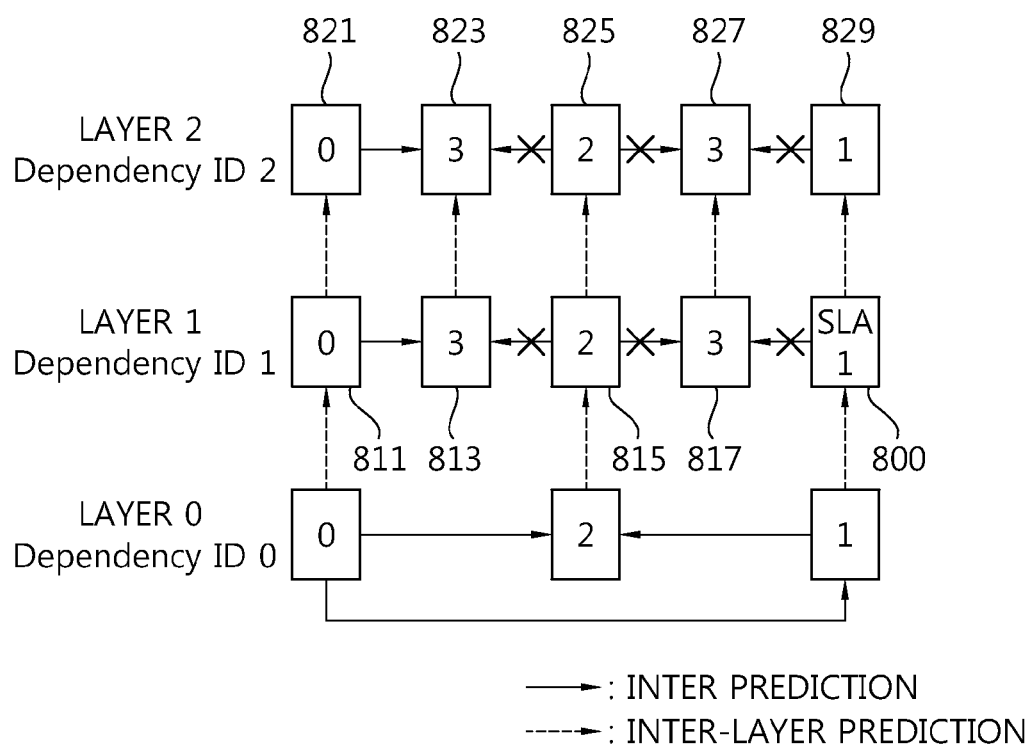
FIG. 8 schematically illustrates that a spatial layer access or scalable layer access (SLA) picture is employed in a scalable coding structure according to an embodiment of the invention.

FIG. 8 schematically illustrates that an SLA picture is employed in a scalable coding structure according to an embodiment of the invention.

The scalable coding structure shown in FIG. 8 supports spatial scalability, and each layer (layer 0, layer 1 and layer 2) is specified by dependency_id to represent a spatial scalability layer.

Further, the scalable coding structure shown in FIG. 8 supports temporal scalability, and each layer is specified by temporal_id to represent a temporal scalability layer.

For instance, layer 0 may be a base layer (basic layer), and layer 1 and layer 2 may be enhancement layers (enhancing layers). Here, layer 0 may support lowest spatial scalability and have dependency_id specified by 0. Layer 2 may support highest spatial scalability and have dependency_id specified by 2.

In addition, each layer (layer 0, layer 1 and layer 2) may include a plurality of temporal layers (temporal sub-layers) to provide temporal scalability, and the temporal layers may be specified by temporal_id. For instance, a temporal layer supporting lowest temporal scalability may have temporal_id specified by 0, and a temporal layer supporting higher temporal scalability may have temporal_id specified by a value greater than 0.

A box shown in FIG. 8 represents a picture, and a number in the box represents temporal_id. An arrow represents a reference relationship indicating whether a picture is allowed to use another picture as a reference picture. A solid-line arrow represents a reference relationship for inter prediction, and a dotted-line arrow represents a reference relationship for inter-layer prediction. An X mark on an arrow indicates that a corresponding picture(s) is not allowed to refer to a picture that the arrow points at.

An embodiment of applying reference relationships of the SLA picture dependently to a spatial layer providing spatial scalability will be described with reference to FIG. 8.

Here, as described above, pictures decoded subsequent to the SLA picture are not allowed to use a picture having temporal_id the same as or greater than that of the SLA picture as a reference picture in inter prediction. Also, the pictures decoded subsequent to the SLA picture are allowed to use a picture having dependency_id smaller than or the same as that of the SLA picture as a reference picture in inter-layer prediction.

As illustrated in FIG. 8, when the SLA picture 800 has temporal_id of 1 and dependency_id of 1, the pictures decoded subsequent to the SLA picture 800 are allowed to use only a picture having temporal_id of 0 as a reference picture for inter prediction according to the rules on the reference relationships of the SLA picture. Also, the pictures decoded subsequent to the SLA picture 800 are allowed to use pictures having dependency_id of 0 and 1 as reference pictures for inter-layer prediction.

For example, when a picture 813 in layer 1 is subjected to inter prediction, a picture 811 having temporal_id of 0 is available as a reference picture but a picture 815 having temporal_id of 2 is unavailable as a reference picture. Likewise, when a picture 823 in layer 2 is subjected to inter prediction, a picture 821 having temporal_id of 0 is available as a reference picture while a picture 825 having temporal_id of 2 is unavailable as a reference picture.

When pictures 811, 815 and 800 in layer 1 are subjected to inter-layer prediction, a picture having dependency_id of 0 is available as a reference picture. Likewise, when pictures 821, 823, 825, 827 and 829 in layer 2 are subjected to inter-layer prediction, pictures 811, 813, 815, 817 and 800 having dependency_id of 1 are available as reference pictures.

The SLA picture according to the embodiment may be signaled using syntax information as shown in Table 1 or Table 2.

Table 1 illustrates examples of NAL unit types. As described above, NAL units may have different types according to properties and kinds of pictures included in the NAL units.

TABLE 1

| nal_unit_type | Content of NAL unit and RBSP syntax structure | NAL unit type class |
|---|---|---|
| 0 | Unspecified | non-VCL |
| 1 | Coded slice of a non-RAP, non-TFD and non-TLA picture slice_layer_rbsp( ) | VCL |
| 2 | Coded slice of a TFD picture slice_layer_rbsp( ) | VCL |
| 3 | Coded slice of a non-TFD TLA picture slice_layer_rbsp( ) | VCL |
| 4, 5 | Coded slice of a CRA picture slice_layer_rbsp( ) | VCL |
| 6, 7 | Coded slice of a BLA picture slice_layer_rbsp( ) | VCL |
| 8 | Coded slice of an IDR picture slice_layer_rbsp( ) | VCL |
| 9 . . . 24 | Reserved | n/a |
| 25 | Video parameter set video_parameter_set_rbsp( ) | non-VCL |
| 26 | Sequence parameter set seq_parameter_set_rbsp( ) | non-VCL |
| 27 | Picture parameter set pic_parameter_set_rbsp( ) | non-VCL |
| 28 | Adaptation parameter set aps_rbsp( ) | non-VCL |
| 29 | Access unit delimiter access_unit_delimiter_rbsp( ) | non-VCL |
| 30 | Filler data filler_data_rbsp( ) | non-VCL |
| 31 | Supplemental enhancement information (SEI) sei_rbsp( ) | non-VCL |
| 32 . . . 47 | Reserved | n/a |
| 48 . . . 63 | Unspecified | non-VCL |

As listed in Table 1, NAL units may be classified into VCL NAL units and non-VCL NAL units according to whether the NAL units include information on a video. A VCL NAL unit is an NAL unit including information on a video, and a non-VCL NAL unit is an NAL unit including necessary information (parameter set or SEI message) for decoding a video.

VCL NAL units may be divided into random access possible pictures and random access impossible pictures. In Table 1, NAL units having nal_unit_type of 4 to 8 are random access possible pictures, and NAL units having nal_unit_type of 1 to 3 are random access impossible pictures.

The SLA picture according to the embodiment may be defined using reserved bits for nal_unit_type, such as 9 to 24 or 32 to 47, in Table 1, and nal_unit_type information may be signalled.

Table 2 illustrates syntax of an extended-type NAL unit header supporting scalability according to an embodiment of the invention.

TABLE 2

| | Descriptor |
|---|---|
| nal_unit_header_svc_extension( ) { | |
|   idr_flag | All u(1) |
|   priority_id | All u(6) |
|   no_inter_layer_pred_flag | All u(1) |
|   spatial_layer_access_flag | |
|   dependency_id | All u(3) |
|   quality_id | All u(4) |
|   temporal_id | All u(3) |
|   use_ref_base_pic_flag | All u(1) |
|   discardable_flag | All u(1) |

TABLE 2-continued

| | Descriptor |
|---|---|
|   output_flag | All u(1) |
|   reserved_three_2bits | All u(2) |
| } | |

Referring to Table 2, the SLA picture may be signaled using spatial_layer_access_flag as a syntax element.

spatial_layer_access_flag is a flag spedifying presence of an SLA picture indicating a random access position at which switching between layers is possible. For instance, spatial_layer_access_flag equal to 1 may specify that an NAL unit includes an SLA picture indicating a random access position at which layer switching is possible in an entire bitstream in encoding. spatial_layer_access_flag equal to 0 may specify that an NAL unit includes no SAL picture in the entire bitstream in encoding.

Meanwhile, the foregoing embodiment suggests an SLA picture as a method of enabling switching, that is, random access, between all layers (for example, temporal, spatial and quality layers) constructed to support temporal, spatial and quality scalabilities in scalable coding.

Hereinafter, another embodiment of the invention illustrates a method of enabling switching between all layers (for example, temporal, spatial and quality layers) by extending a concept of the foregoing TLA picture for indicating switching between temporal layers.

A scalable coding structure according to the present embodiment of the invention provides a layer access (LA) picture as an NAL unit type for indicating a random access point at which layer switching is possible between all layers, such as a temporal layer as a layer of a bitstream temporally scalable, a spatial layer as a layer of a bitstream spatially scalable and a quality layer as a layer of a bitstream scalable in quality.

An LA picture is a picture indicating a random access point at which layer switching is possible. When an NAL unit type (nal_unit_type) of all VCL NAL units of a specific picture has a value of 3, the specific picture may be an LA picture. Here, an LA picture and pictures to be decoded subsequent to the LA picture may have constraints on reference relationships as follows so as to perform a random access function.

An LA picture and pictures following the LA picture in decoding order but having a layer level the same as or greater than a layer level of the LA picture are not allowed to use a picture preceding the LA picture in decoding order but having a layer level the same as or greater than the layer level of the LA picture as a reference picture in prediction. The LA picture may not be a TFD picture. Thus, the LA picture may be a non-TFD LA picture.

Here, as described above, a TFD picture means a un-decodable leading picture, which may be discarded. A TFD picture refers to a picture not normally decoded as if referring to an unavailable reference picture and is excluded in decoding and output processes.

The aforementioned TLA picture describes the constraints on the reference relationships for inter prediction, while the LA picture according to the present embodiment describes reference relationships for prediction to include inter prediction and inter-layer prediction. Also, the TLA picture presents the reference relationships using temporal_id to specify temporal scalability, whereas the LA picture presents the reference relationships using a layer level to include various scalabilities. A layer level may be a temporal level, a spatial level or a quality level depending on a scalability kind.

Figure 9:
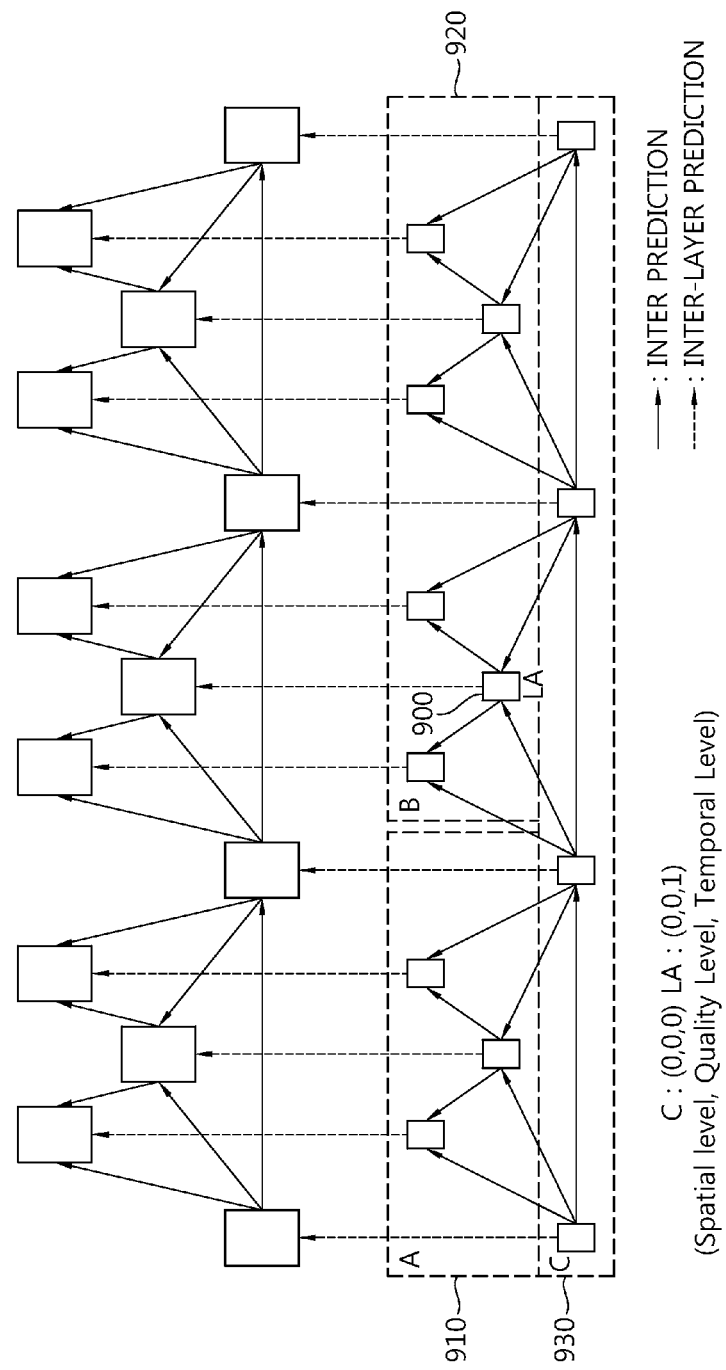
FIG. 9 schematically illustrates that a layer access (LA) picture is employed in a scalable coding structure according to an embodiment of the invention.

FIG. 9 schematically illustrates that an LA picture is employed in a scalable coding structure according to an embodiment of the invention.

The scalable coding structure shown in FIG. 9 provides spatial, quality and temporal scalabilities. A spatial layer is specified by a spatial level value so as to represent a spatial scalability layer, a quality layer is specified by a quality level value so as to represent a quality scalability layer, and a temporal layer is specified by a temporal level value so as to represent a temporal scalability layer. In the present embodiment, a spatial level, a quality level and a temporal level are provided for illustrative purposes only, without limiting the invention thereto. Alternatively, dependency_id, quality_id and temporal_id, which are mentioned above, may be also used.

For instance, an LA picture 900 is a picture with a spatial level of 0, a quality level of 0 and a temporal level of 1. The LA picture 900 with the spatial level, the quality level and the temporal level may be represented as a layer level format of (0,0, 1).

Pictures in group A 910 of FIG. 9 are pictures preceding the LA picture 900 in decoding order and having a layer level the same as or greater than that of the LA picture 900.

Pictures in group B 920 are pictures following the LA picture 900 in decoding order and having a layer level the same as or greater than that of the LA picture 900.

Pictures in group C 930 are pictures having a layer level smaller than that of the LA picture 900.

Here, the LA picture 900 and all pictures in group B 920 are not allowed to use the pictures in group A 910 as a reference picture, because the LA picture and a picture decoded subsequent to the LA picture are not allowed to use a picture having a layer level the same as or greater than that of the LA picture as a reference picture. That is, the LA picture and the picture decoded subsequent to the LA picture are allowed to use a picture having a layer level smaller than that of the LA picture as a reference picture.

Such constraints on reference relationships enable temporal layer switching (temporal layer access) at a position of the LA picture 900.

Figure 10:
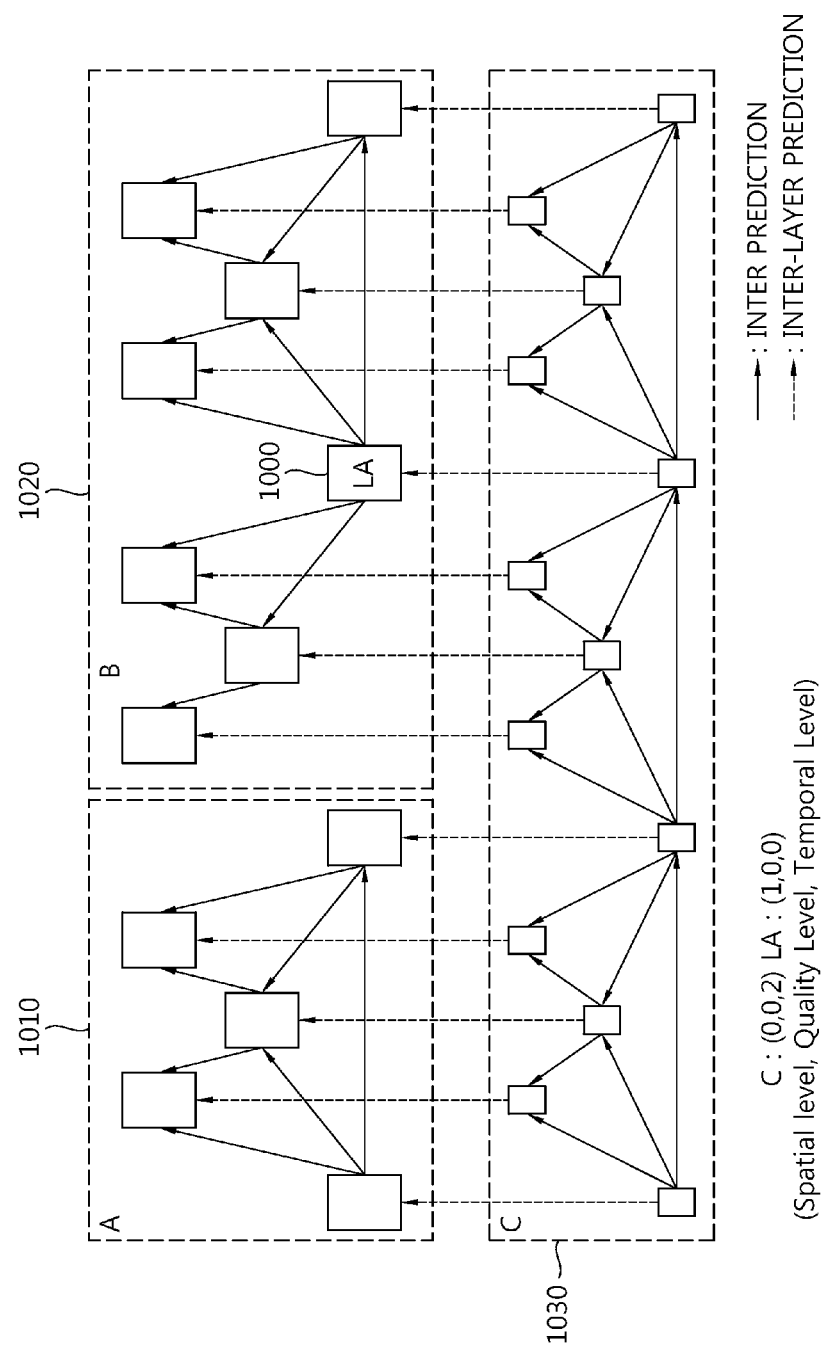
FIG. 10 schematically illustrates that an LA picture is employed in a scalable coding structure according to another embodiment of the invention.

FIG. 10 schematically illustrates that an LA picture is employed in a scalable coding structure according to another embodiment of the invention.

The scalable coding structure shown in FIG. 10 provides spatial, quality and temporal scalabilities. A spatial layer is specified by a spatial level value so as to represent a spatial scalability layer, a quality layer is specified by a quality level value so as to represent a quality scalability layer, and a temporal layer is specified by a temporal level value so as to represent a temporal scalability layer. In the present embodiment, a spatial level, a quality level and a temporal level are provided for illustrative purposes only, without limiting the invention thereto. Alternatively, dependency_id, quality_id and temporal_id, which are mentioned above, may be also used.

For instance, an LA picture 1000 is a picture with a spatial level of 1, a quality level of 0 and a temporal level of 0. The LA picture 1000 with the spatial level, the quality level and the temporal level may be represented as a layer level format of (1,0, 0).

Pictures in group A 1010 of FIG. 10 are pictures preceding the LA picture 1000 in decoding order and having a layer level the same as or greater than that of the LA picture 1000.

Pictures in group B 1020 are pictures following the LA picture 1000 in decoding order and having a layer level the same as or greater than that of the LA picture 1000.

Pictures in group C 1030 9 are pictures having a layer level smaller than that of the LA picture 1000.

Here, the LA picture 1000 and all pictures in group B 1020 are not allowed to use the pictures in group C 1030 having a smaller spatial level than that of the LA picture 1000 as a reference picture. Also, the LA picture 1000 and all pictures in group B 1020 are not allowed to use the pictures in group A 1010 as a reference picture.

This is because the LA picture and a picture decoded subsequent to the LA picture are not allowed to use a picture having a layer level the same as or greater than that of the LA picture as a reference picture. That is, the LA picture and the picture decoded subsequent to the LA picture are allowed to use a picture having a layer level smaller than that of the LA picture as a reference picture.

Such constraints on reference relationships enable spatial layer switching (spatial layer access) at a position of the LA picture 1000.

Figure 11:
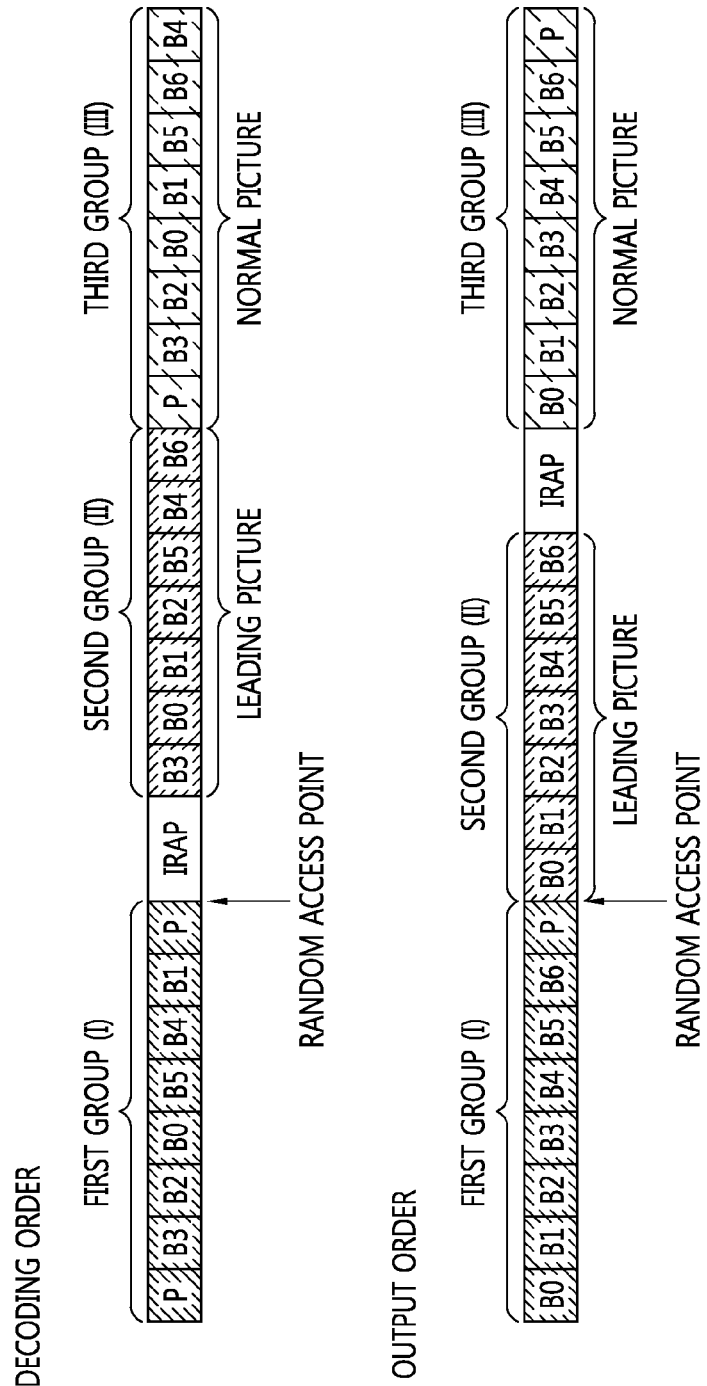
FIG. 11 illustrates a randomly accessible picture.

FIG. 11 illustrates a randomly accessible picture.

The randomly accessible picture, that is, an intra random access point (IRAP) picture as a random access point, is a first picture of a bitstream in decoding order at random access and includes I slices only.

FIG. 11 shows output order or display order and decoding order of pictures. As shown in FIG. 11, the output order of the pictures may be different from the decoding order of the pictures. For convenience of description, the pictures are divided into groups.

Pictures in a first group (I) precede the IRAP picture in both output order and decoding order, while pictures in a second group (II) precede the IRAP picture in output order but follows the IRAP picture in decoding order. Pictures in a third group (III) follows the IRAP picture in both output order and decoding order.

The pictures in the first group (I) may be decoded and output regardless of the IRAP picture.

The pictures in the second group (II) output before the IRAP picture are referred to leading pictures, which may cause a problem in a decoding process when the IRAP picture is used as a random access point.

The pictures in the third group (III) following the IRAP picture in terms of output and decoding orders are referred to as normal pictures. The normal pictures are not used as a reference picture of the leading pictures.

A random access point in a bitstream at which random access happens is the IRAP picture, and random access starts as a first picture in the second group (II) is output.

Meanwhile, the IRAP picture may be any one of an instantaneous decoding refresh (IDR) picture, a clean random access (CRA) picture and a broken link access (BLA) picture.

Figure 12:
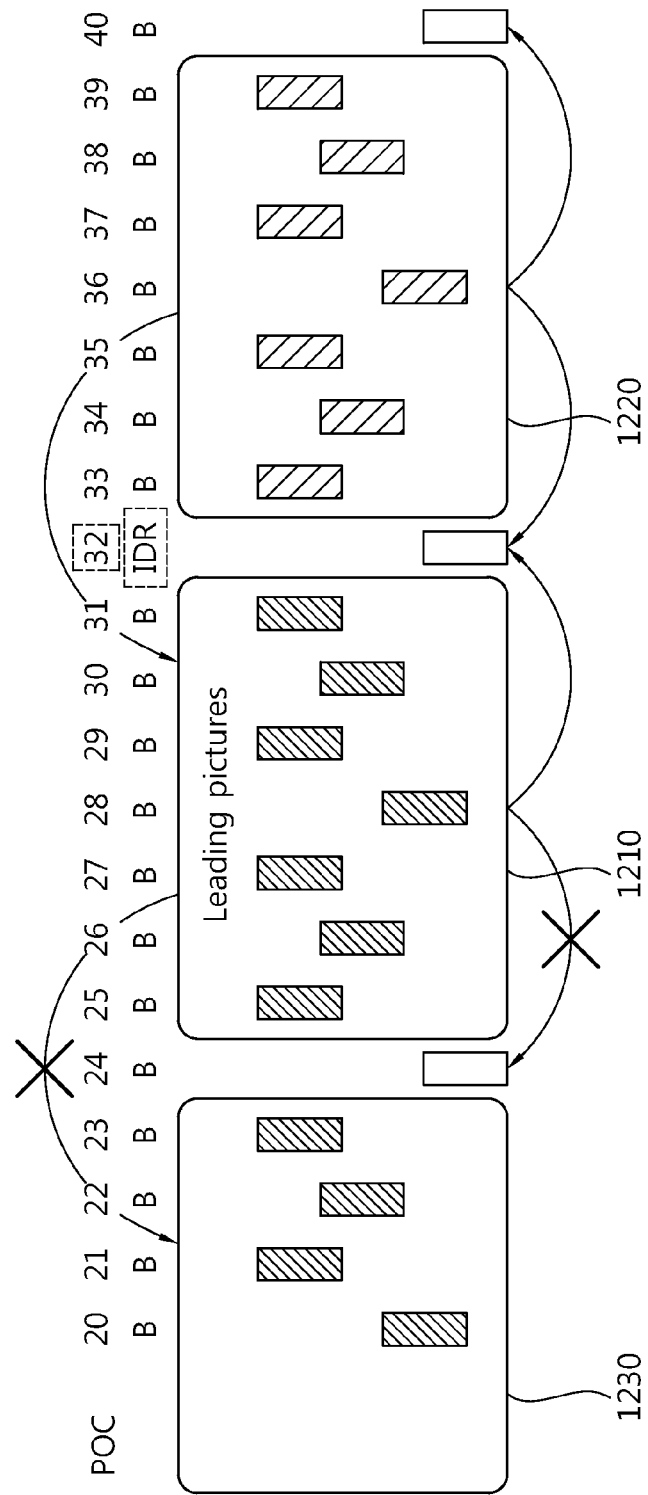
FIG. 12 illustrates an instantaneous decoding refresh (IDR) picture.

FIG. 12 illustrates an IDR picture.

The IDR picture is a random access point when a picture group (GOP) has a closed structure. The IDR picture is an IRAP picture and thus includes I slices only. The IRD picture may be a first picture in decoding order or appear in a middle of a bitstream. When the IDR picture is decoded, all reference pictures stored in a decoded picture buffer (DPB) are indicated as "unused for reference."

In FIG. 12, a bar represents a picture, and an arrow represents a reference relationship indicating whether one picture is allowed to use another picture as a reference picture. An X mark on an arrow indicates that picture(s) is not allowed to refer to a picture that the arrow points at.

As shown in FIG. 12, a POC of the IDR picture is 32, and pictures having a POC ranging from 25 to 31 and being output before the IDR picture are leading pictures 1210. Pictures having a POC greater than 33 are normal pictures 1220.

The leading pictures 1210 preceding the IDR picture are allowed to use the IDR picture and other leading pictures as reference pictures but are not allowed to use a previous picture 1230 preceding the leading pictures 1210.

The normal pictures 1220 following the IDR picture may be decoded by referring to the IDR picture, the leading pictures and other normal pictures.

Figure 13:
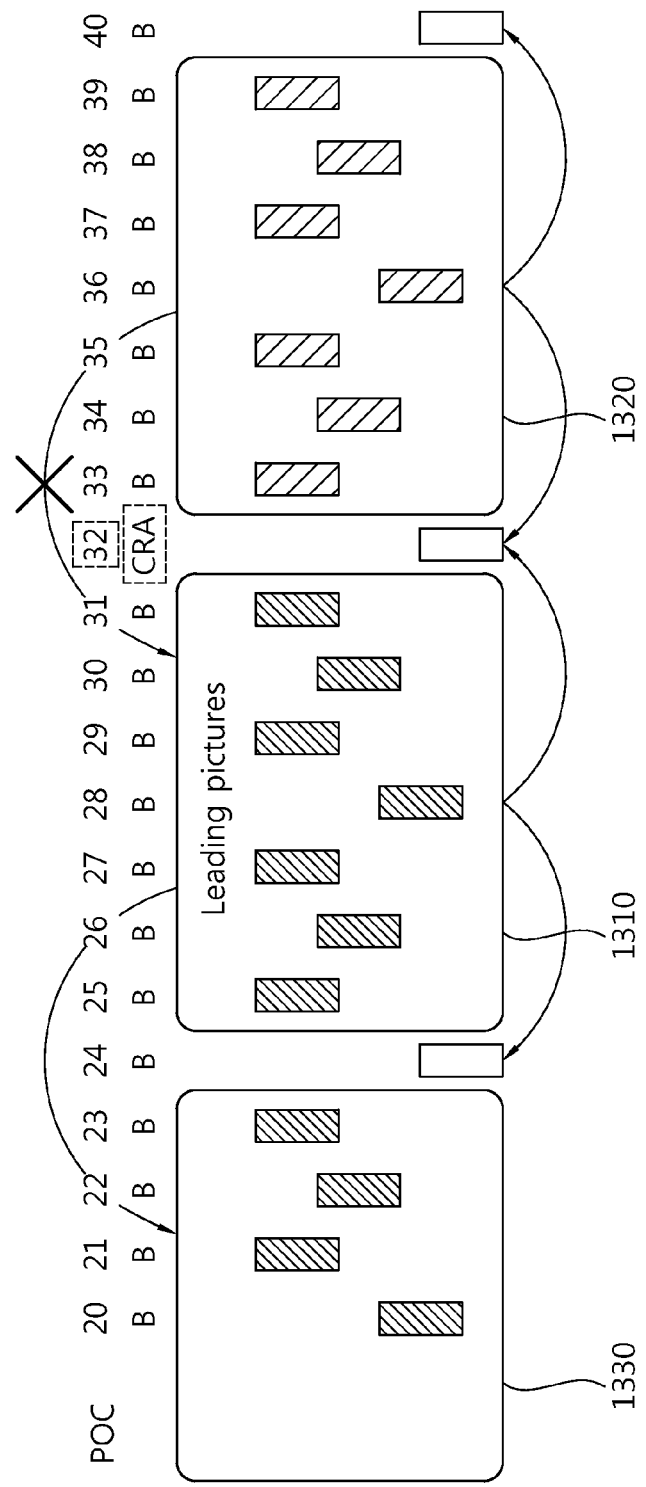
FIG. 13 illustrates a clean random access (CRA) picture.

FIG. 13 illustrates a CRA picture.

The CRA picture is a random access point when a picture group (GOP) has an open structure. The CRA picture is also an IRAP picture and thus includes I slices only. The IRD picture may be a first picture in a bitstream in decoding order or appear in a middle of the bitstream for normal play.

In FIG. 13, a bar represents a picture, and an arrow represents a reference relationship indicating whether one picture is allowed to use another picture as a reference picture. An X mark on an arrow indicates that a picture or pictures are not allowed refer to a picture that the arrow points at.

Leading pictures 1310 preceding the CRA picture may use all of the CRA picture, other leading pictures and a previous picture 1330 preceding the leading pictures 1310 as reference pictures.

However, normal pictures 1320 following the CRA picture may be decoded by referring to the CRA picture and other normal pictures but are not allowed to use the leading pictures 1310 as reference pictures.

A BLA picture is a picture which has similar functions and properties to those of the CRA picture and is present in a middle of a bitstream as a random access point when coded pictures are spliced or the bitstream is broken in the middle. However, since the BLA picture is considered as a start of a new sequence, all parameter information on a video is received again when the BLA picture is received by a decoder, unlike the CRA picture.

The BLA picture may be determined by an encoder, or a system receiving a bitstream from the encoder may change a received CRA picture into a BLA picture. For example, when bitstreams are spliced, the system changes a CRA picture into a BLA picture and transmits the BLA picture to a decoder for decoding a video. Here, refreshed parameter information on the video is also provided from the system to the decoder. In the present invention, the decoder refers to any device including a video processing unit to decode a video, which may be the decoder of FIG. 2 or a decoding module for processing a video as a core module.

Figure 14:
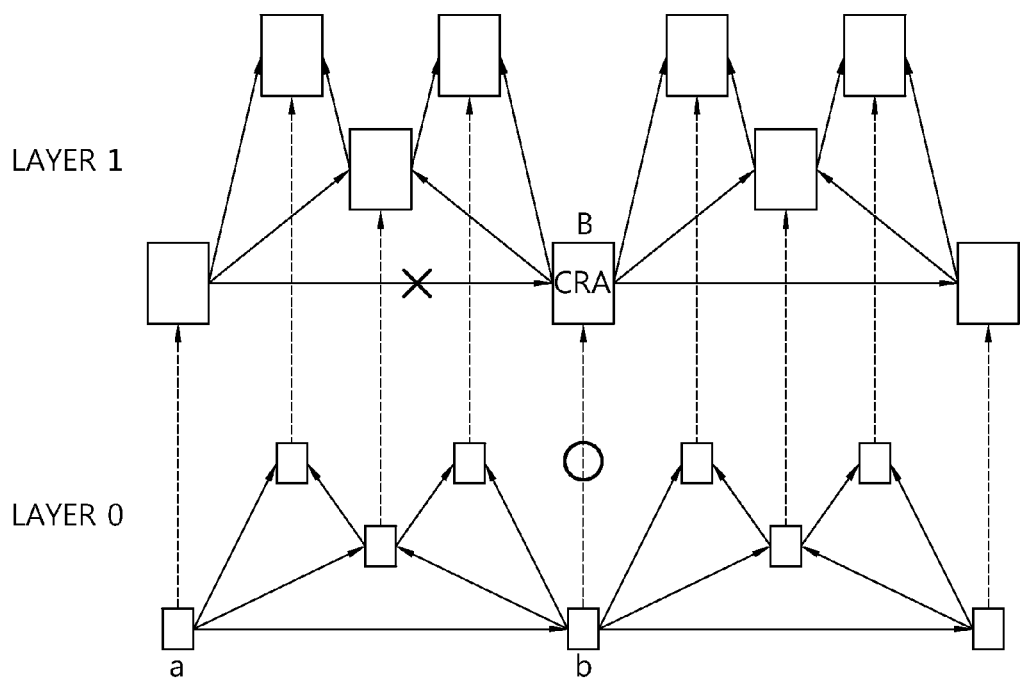
FIG. 14 illustrates a random access picture in a scalable coding structure.

FIG. 14 illustrates a random access picture in a scalable coding structure.

The scalable coding structure shown in FIG. 14 includes two spatial layers supporting spatial scalability. Layer 0 (or lower layer) may support lowest spatial scalability and have dependency_id specified by 0. Layer 1 (or higher layer) may support highest spatial scalability and have dependency_id specified by 1.

Also, the scalable coding structure shown in FIG. 14 supports temporal scalability, and thus each layer (layer 0 and layer 1) includes a plurality of temporal layers (temporal sub-layers). The temporal layers may be specified by temporal_id. For instance, a temporal layer supporting lowest temporal scalability may have temporal_id specified by 0, and a temporal layer supporting higher temporal scalability may have temporal_id specified by a value greater than 0.

A box shown in FIG. 14 represents a picture, and an arrow represents a reference relationship indicating whether a picture is allowed to use another picture as a reference picture. A solid-line arrow represents a reference relationship for inter prediction, and a dotted-line arrow represents a reference relationship for inter-layer prediction. An X mark on an arrow indicates that a corresponding picture(s) is not allowed to refer to a picture that the arrow points at, and an 0 mark on an arrow indicates that a corresponding picture(s) is allowed to refer to a picture that the arrow points at.

As illustrated in FIG. 14, when picture B in the higher layer (layer 1) is a random access picture (for example, a CRA picture), inter prediction for picture B is impossible but inter-layer prediction for picture may be possible. That is, picture B (CRA picture) as the random access picture is not allowed to use a picture in the same spatial layer (layer 1) as that of picture B as a reference picture but is allowed to use a picture in a lower spatial layer (layer 0) than that of picture B as a reference picture.

For instance, when picture B in the higher layer (layer 1) is a random access picture (for example, a CRA picture) and picture b in the lower layer (layer 0) is not a random access picture, picture b may be subjected to inter prediction using picture a as a reference picture. In this case, picture B predicted via inter-layer prediction with reference to picture b has the same reference relationship as that for inter prediction, due to picture b. Such a reference relationship may cause picture B not to perform a random access function.

Thus, when a picture in the higher layer is a random access picture but a picture in the lower layer that the random access picture in the higher layer refers to is not a random access picture, the random access picture in the higher layer may not serve as a random access point.

To solve the foregoing problem, the invention suggests a method of predicting a random access picture or a picture following the random access picture in decoding order (constraints on reference relationships) below.

1. According to an embodiment of the present invention, when a picture in the higher layer is a random access picture but a picture in the lower layer that the random access picture in the higher layer refers to is not a random access picture, not inter-layer texture prediction but only inter-layer syntax prediction may be performed in inter-layer prediction of the random access picture in the higher layer (or a picture following the random access picture in decoding order). And inter prediction may be performed for the random access picture in the higher layer (or a picture following the random access picture in decoding order).

2. According to another embodiment of the present invention, when a picture in the higher layer is a random access picture but a picture in the lower layer that the random access picture in the higher layer refers to is not a random access picture, neither inter-layer prediction nor inter prediction may be performed for the random access picture in the higher layer (or a picture following the random access picture in decoding order).

As described above, inter prediction is a method of performing prediction on the basis of information (motion information) on at least one of a previous picture and/or a subsequent picture of a current picture and generates a predicted block corresponding to the current block.

Inter-layer prediction refers to a method of predicting current layer information using another layer information, wherein the current layer information predicted using the other layer information (that is, predicted by the inter-layer prediction) may include a texture, motion information, unit information, a predetermined parameter (for example, a filtering parameter), or the like.

Here, inter-layer texture prediction is also referred to as inter-layer intra prediction or intra base layer (BL) prediction. Inter-layer texture prediction may be applied when a reference block in a reference layer is reconstructed by intra prediction. Inter-layer texture prediction may use a texture of a reference block in a reference layer as a predictive value for a current block in an enhancement layer. Here, the texture of the reference block may be scaled by upsampling.

Inter-layer syntax (parameter) prediction may derive a syntax (parameter) used in a base layer to be reused for an enhancement layer or may predict a syntax (parameter) for the enhancement layer based on the parameter used in the base layer.

Figure 15:
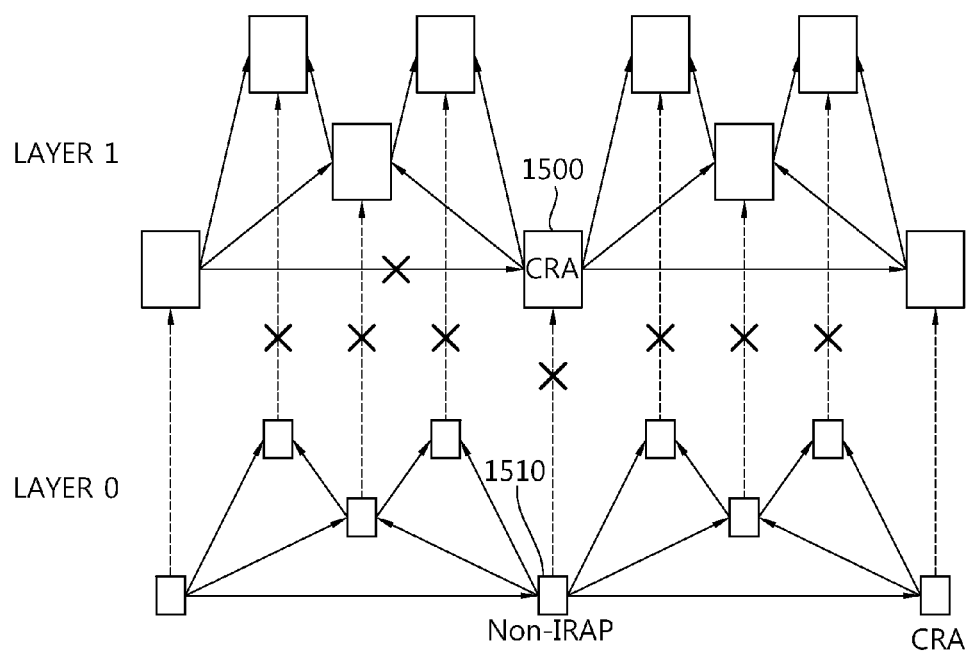
FIG. 15 schematically illustrates that a random access picture is employed in a scalable coding structure according to an embodiment of the invention.

FIG. 15 schematically illustrates that a random access picture is employed in a scalable coding structure according to an embodiment of the invention.

The scalable coding structure shown in FIG. 15 includes two spatial layers supporting spatial scalability. Layer 0 (or lower layer) may support lowest spatial scalability and have dependency_id specified by 0. Layer 1 (or higher layer) may support highest spatial scalability and have dependency_id specified by 1.

Also, the scalable coding structure shown in FIG. 15 supports temporal scalability, and thus each layer (layer 0 and layer 1) includes a plurality of temporal layers (temporal sub-layers). The temporal layers may be specified by temporal_id. For instance, a temporal layer supporting lowest temporal scalability may have temporal_id specified by 0, and a temporal layer supporting higher temporal scalability may have temporal_id specified by a value greater than 0.

A box shown in FIG. 15 represents a picture, and an arrow represents a reference relationship indicating whether a picture is allowed to use another picture as a reference picture. A solid-line arrow represents a reference relationship for inter prediction, and a dotted-line arrow represents a reference relationship for inter-layer prediction. An X mark on an arrow indicates that a corresponding picture(s) is not allowed to refer to a picture that the arrow points at.

As illustrated in FIG. 15, when a picture 1500 in the higher layer (layer 1) is a random access picture (for example, a CRA picture) and a picture 1510 in the lower layer (layer 0) that the picture 1500 in the higher layer (layer 1) refers to is not a random access picture (for example, a non-IRAP picture), the following may be applied so that the picture 1500 in the higher layer (layer 1) is used for a random access picture.

The random access picture 1500 and a picture(s) following the random access picture 1500 in decoding order may be subjected to only inter-layer syntax prediction. Inter-layer texture prediction and inter prediction may not be applied.

Alternatively, the random access picture 1500 and a picture(s) following the random access picture 1500 in decoding order may not be subjected to inter-layer prediction.

That is, the random access picture 1500 and a picture(s) following the random access picture 1500 in decoding order are not allowed to use a picture in the lower layer as a reference picture.

Thus, when a picture in a current layer is a random access picture and a picture in a lower layer that the picture in the current layer refers to is not a random access picture, according to the foregoing rules on reference relationships of the present embodiment, the random access picture in the current layer and a picture(s) following the random access picture in decoding order have no reference relationship with the picture in the lower layer. Accordingly, the random access picture in the current layer may serve as a random access point. Here, the random access picture may be the CRA picture illustrated above in FIGS. 11 to 13.

Figure 16:
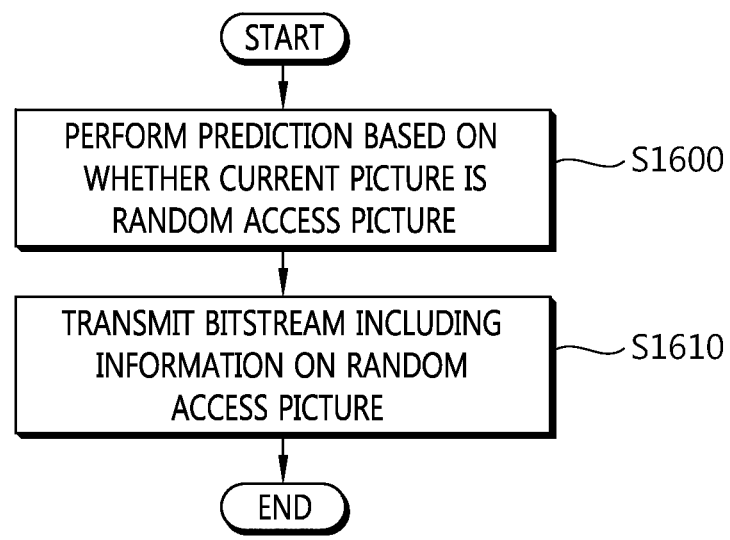
FIG. 16 is a flowchart schematically illustrating a scalable video encoding method according to an embodiment of the invention.

FIG. 16 is a flowchart schematically illustrating a scalable video encoding method according to an embodiment of the invention.

The method of FIG. 16 may be carried out by the encoder illustrated above in FIG. 1. In detail, the prediction modules of FIG. 1 or the inter-layer prediction module of FIG. 3 may conduct the method. For convenience of description, the embodiment of FIG. 16 explains that the method of FIG. 16 is carried out by the encoder.

Referring to FIG. 16, the encoder predicts a current picture (or a picture encoded subsequent to the current picture) based on whether the current picture is a random access picture and encodes information on the random access picture (S1600).

Here, a random access picture refers to a picture including information indicating a random access point at which a switch from a first layer to a second layer is possible.

A layer refers to at least one of a temporal layer supporting temporal scalability, a spatial layer supporting spatial scalability, and a quality layer supporting quality scalability.

For example, the encoder may derive reference picture information (for example, a reference picture list) based on information on a reference relationship of the random access picture when the current picture is designated as the random access picture. The encoder may predict the current picture or the picture encoded subsequent to the current picture using the reference picture information.

Here, the reference picture information (reference picture list) may be derived based on at least one of a temporal layer identifier (ID) for identifying a temporal layer for a picture, a spatial layer ID for identifying a spatial layer for the picture, and a quality layer ID for identifying a quality layer for the picture.

Methods of deriving a reference picture for the random access picture and the picture encoded subsequent to the random access picture in a scalable coding structure supporting at least one of temporal, spatial and quality scalabilities have been illustrated in detail in the aforementioned embodiments of the invention. For instance, the rules on the reference relationships with the SLA picture, the LA picture and the CRA picture according to the embodiments may be employed.

The information on the random access picture (for example, information indicating whether the current picture is a random access picture, information on a random access picture type, or the like) may be encoded as an NAL unit type or a syntax, as described above. The information may be signaled to the decoder.

Further, identification information for identifying a plurality of layers supporting scalability in the scalable coding structure may be encoded as a syntax and signaled to the decoder. The identification information may be the temporal layer ID (temporal_id) for identifying the temporal layer, the spatial layer ID (spatial_id) for identifying the spatial layer, and the quality layer ID (quality_id) for identifying the quality layer.

The encoder may transmit a bitstream including the encoded information on the random access picture to the decoder (S1610).

Figure 17:
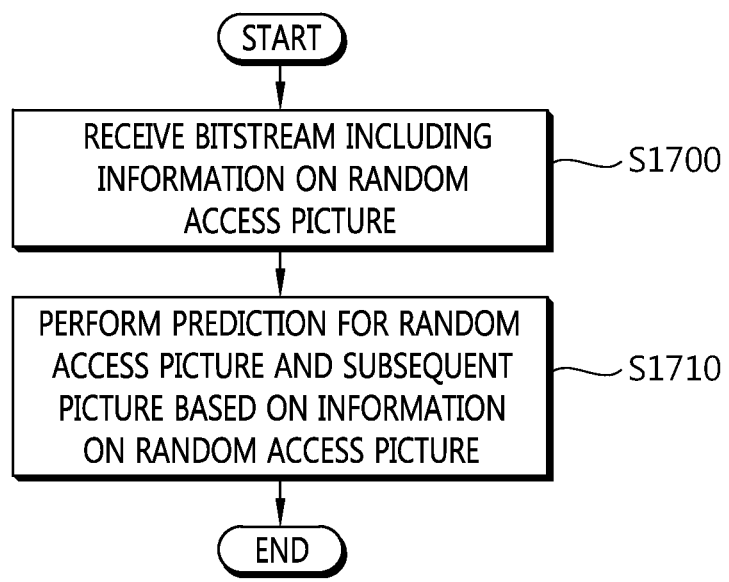
FIG. 17 is a flowchart schematically illustrating a scalable video decoding method according to an embodiment of the invention.

FIG. 17 is a flowchart schematically illustrating a scalable video decoding method according to an embodiment of the invention.

The method of FIG. 17 may be carried out by the decoder illustrated above in FIG. 2. In detail, the prediction modules of FIG. 2 or the inter-layer prediction module of FIG. 3 may conduct the method. For convenience of description, the embodiment of FIG. 17 explains that the method of FIG. 17 is carried out by the decoder.

Referring to FIG. 17, the decoder receives a bitstream including information on a random access picture (S1700).

Here, a random access picture refers to a picture including information indicating a random access point at which a switch from a first layer to a second layer is possible.

A layer refers to at least one of a temporal layer supporting temporal scalability, a spatial layer supporting spatial scalability, and a quality layer supporting quality scalability.

The information on the random access picture may be information indicating whether a current picture is a random access picture, information on a random access picture type, or the like. The information on the random access picture may be stored and signaled as an NAL unit type or a syntax.

Further, identification information for identifying a plurality of layers supporting scalability in a scalable coding structure may be obtained from the bitstream. The identification information may be a temporal layer ID (temporal_id) for identifying a temporal layer, a spatial layer ID (spatial_id) for identifying a spatial layer, and a quality layer ID (quality_id) for identifying a quality layer.

The decoder may acquire the information on the random access picture and the identification information through parsing. A process of parsing various kinds of information included in the bitstream may be carried out by the entropy decoding modules or a separate parsing module.

The decoder predicts the random access picture and a picture decoded subsequent to the random access picture based on the information on the random access picture (S1710).

For example, when the current picture is a random access picture, the decoder may derive reference picture information (for example, a reference picture list) on the current picture or the picture encoded subsequent to the current picture based on information on a reference relationship of the random access picture and perform prediction.

Here, the reference picture information (reference picture list) may be derived based on at least one of a temporal layer ID for identifying a temporal layer for a picture, a spatial layer ID for identifying a spatial layer for the picture, and a quality layer ID for identifying a quality layer for the picture.

Methods of deriving a reference picture for the random access picture and the picture encoded subsequent to the random access picture in a scalable coding structure supporting at least one of temporal, spatial and quality scalabilities have been illustrated in detail in the aforementioned embodiments of the invention. For instance, the rules on the reference relationships with the SLA picture, the LA picture and the CRA picture according to the embodiments may be employed.

While the methods in the above-mentioned exemplary system have been described on the basis of flowcharts including a series of steps or blocks, the invention is not limited to the order of steps and a certain step may be performed in a step or an order other than described above or at the same time as described above. The above-mentioned embodiments may include various examples. Therefore, the invention includes all substitutions, corrections, and modifications belonging to the appended claims.

The invention claimed is:

1. A video decoding method comprising:
receiving, by a decoding apparatus, a bitstream comprising information on a random access picture in a current layer;
predicting, by the decoding apparatus, the random access picture and a subsequent picture following the random access picture in decoding order in the current layer on the basis of the information on the random access picture,
wherein the predicting comprises deriving a reference picture for the random access picture and the subsequent picture on the basis of at least one of a temporal layer identifier to identify a temporal layer, a spatial layer identifier to identify a spatial layer, and a quality layer identifier to identify a quality layer,
wherein in the predicting, when inter prediction is performed for the random access picture and the subsequent picture, a picture having a temporal layer identifier value the same as or greater than a temporal layer identifier value of the random access picture is not used as a reference picture; and
generating, by the decoding apparatus, reconstructed pictures based on the result of the predicting,
wherein the information on the random access picture comprises information specifying whether a current picture is a cross-layer random access point at which switching from a first layer to a second layer is possible,
wherein the first layer and the second layer are a first spatial layer and a second spatial layer for supporting spatial scalability, or a first quality layer and a second quality layer for supporting quality scalability, wherein the first layer is a lower layer than the second layer,
wherein in the predicting,
when a corresponding picture, of the random access picture, in the first layer is a random access point picture, inter-layer prediction is available for the random access picture in the current layer which is the second layer, and
when the corresponding picture in the first layer is not a random access point picture, inter-layer prediction is not available for the random access picture in the current layer which is the second layer.

2. The video decoding method of claim 1, wherein in the predicting, when inter-layer prediction is performed for the random access picture and the subsequent picture, a picture having a spatial layer identifier value smaller than or the same as a spatial layer identifier value of the random access picture or a picture having a quality layer identifier value smaller than or the same a quality layer identifier value of the random access picture is used as a reference picture.

3. The video decoding method of claim 1, wherein the information on the random access picture further comprises information on a random access picture type, and the information on the random access picture type is defined as a network abstraction layer (NAL) unit type.

4. The video decoding method of claim 1, wherein the information on the random access picture is stored as syntax information.

5. The video decoding method of claim 1, wherein the random access picture is one of a spatial layer access or scalable layer access (SLA) picture, a layer access (LA) picture and a clean random access (CRA) picture.

6. A video decoding apparatus comprising:
an entrophy decoder to receive a bitstream comprising information on a random access picture in a current layer;
a predictor to predict the random access picture and a subsequent picture following the random access picture in decoding order in the current layer on the basis of the information on the random access picture,
wherein the predicting comprises deriving a reference picture for the random access picture and the subsequent picture on the basis of at least one of a temporal layer identifier to identify a temporal layer, a spatial layer identifier to identify a spatial layer, and a quality layer identifier to identify a quality layer,
wherein in the predicting, when inter prediction is performed for the random access picture and the subsequent picture, a picture having a temporal layer identifier value the same as or greater than a temporal layer identifier value of the random access picture is not used as a reference picture; and
an adder to generate reconstructed pictures based on the result of the prediction,
wherein the information on the random access picture comprises information specifying whether a current picture is a picture is a cross-layer random access point at which switching from a first layer to a second layer is possible,
wherein the first layer and the second layer are a first spatial layer and a second spatial layer for supporting spatial scalability, or a first quality layer and a second quality layer for supporting quality scalability, wherein the first layer is a lower layer than the second layer,
wherein in the predicting,
when a corresponding picture, of the random access picture, in the first layer is a random access point picture, inter-layer prediction is available for the random access picture in the current layer which is the second layer, and
when the corresponding picture in the first layer is not a random access point picture, inter-layer prediction is not available for the random access picture in the current layer which is the second layer.

* * * * *